(12) United States Patent
Amitai

(10) Patent No.: US 11,061,235 B2
(45) Date of Patent: Jul. 13, 2021

(54) COMPACT DISPLAY SYSTEM HAVING UNIFORM IMAGE

(71) Applicant: OORYM OPTICS LTD., Rehovot (IL)

(72) Inventor: Yaakov Amitai, Rehovot (IL)

(73) Assignee: OORYM OPTICS LTD., Rehovot (IL)

( * ) Notice: Subject to any disclaimer, the term of this patent is extended or adjusted under 35 U.S.C. 154(b) by 325 days.

(21) Appl. No.: 15/999,102

(22) PCT Filed: Feb. 15, 2017

(86) PCT No.: PCT/IL2017/050191
§ 371 (c)(1),
(2) Date: Aug. 17, 2018

(87) PCT Pub. No.: WO2017/141239
PCT Pub. Date: Aug. 24, 2017

(65) Prior Publication Data
US 2020/0319459 A1 Oct. 8, 2020

(30) Foreign Application Priority Data

Feb. 18, 2016 (IL) .......................................... 244177

(51) Int. Cl.
*G02B 27/01* (2006.01)
*G02B 27/10* (2006.01)

(52) U.S. Cl.
CPC ......... *G02B 27/0172* (2013.01); *G02B 27/10* (2013.01); *G02B 2027/0123* (2013.01)

(58) Field of Classification Search
CPC .... G02B 5/1857; G02B 1/007; G02B 27/283; G02B 5/1833; G02B 5/1866; G02B 5/32;
(Continued)

(56) References Cited

U.S. PATENT DOCUMENTS

2009/0122414 A1* 5/2009 Amitai ............... G02B 27/0172
359/633
2010/0328574 A1* 12/2010 Gourlay ............... G02B 6/0021
349/62
(Continued)

FOREIGN PATENT DOCUMENTS

DE 10 2014 207 500 5/2015

OTHER PUBLICATIONS

European Patent Office, European International Search Report and Written Opinion of the International Searching Authority, PCT/IL2017/050191, dated May 31, 2017, 15 pages.
(Continued)

*Primary Examiner* — Brandi N Thomas

(57) ABSTRACT

There is provided an optical device, including a light-transmitting substrate having a refractive index, at least two major surfaces and edges, an optical element for coupling light waves into the substrate for effecting total internal reflection, at least one element carried by the first substrate for coupling light waves out of the substrate, and a first transparent plate, having at least two major surfaces, one of the major surfaces of the first transparent plate being optically cemented, with a first optical adhesive having a refractive index, to one of the major surfaces of the light-transmitting substrate, defining a first interface surface, light waves coupled inside the substrate are partially reflected from the interface plane and partially pass through it, wherein the refractive index of the optical adhesive is different than the refractive index of the light transmitting substrate.

9 Claims, 14 Drawing Sheets

(58) Field of Classification Search
CPC .......... G02B 13/22; G02B 1/105; G02B 1/14; G02B 26/005; G02B 27/145; G02B 3/0012; G02B 3/0056; G02B 3/14; G02B 27/1073; G02B 27/126; G02B 27/149; G02B 30/26; G02B 5/0825; G02B 5/0833; G02B 6/0038; G02B 13/24; G02B 21/00; G02B 21/02; G02B 27/0025; G02B 27/0172; G02B 27/40; G02B 3/0006; G02B 3/0087; G02B 3/02; G02B 6/003; G02B 6/0048; G02B 6/0056
USPC .................................................. 359/619–633
See application file for complete search history.

(56) References Cited

U.S. PATENT DOCUMENTS

| | | | |
|---|---|---|---|
| 2012/0062998 A1 | 3/2012 | Schultz et al. | |
| 2012/0075698 A1* | 3/2012 | Minami | G02B 6/0043 359/462 |
| 2014/0118813 A1* | 5/2014 | Amitai | G02B 30/35 359/246 |

OTHER PUBLICATIONS

T. Schneider et al., "Optical Characterisation of a Three Layer Waveguide Structure by m-Lines Spectroscopy", Taylor & Francis Group, Ferroelectrics, 2007, pp. 50-60.

\* cited by examiner $\nu_{cement} = 1.315$ $\nu_{cement} = 1.42$

COMPACT DISPLAY SYSTEM HAVING UNIFORM IMAGE

FIELD OF THE INVENTION

The present invention relates to substrate-guided optical devices, and particularly to devices which include reflecting surfaces carried by a common light-transmissive substrate.

The invention can be implemented to advantage in a large number of imaging applications, such as, head-mounted and head-up displays, cellular phones, compact displays, 3-D displays, compact beam expanders, as well as non-imaging applications such as flat-panel indicators, compact illuminators and scanners.

BACKGROUND OF THE INVENTION

One of the important applications for compact optical elements is in head-mounted displays (HMDs), wherein an optical module serves both as an imaging lens and a combiner, in which a two-dimensional display is imaged to infinity and reflected into the eye of an observer. The display can be obtained directly from either a spatial light modulator (SLM) such as a cathode ray tube (CRT), a liquid crystal display (LCD), an organic light emitting diode array (OLED), or a scanning source and similar devices, or indirectly, by means of a relay lens or an optical fiber bundle. The display comprises an array of elements (pixels) imaged to infinity by a collimating lens and transmitted into the eye of the viewer by means of a reflecting, or partially reflecting surface, acting as a combiner for non-see-through and see-through applications, respectively. Typically, a conventional, free-space optical module is used for these purposes. As the desired field-of-view (FOV) of the system increases, such a conventional optical module becomes larger, heavier and bulkier, and therefore, even for a moderate performance device, is impractical. This is a major drawback for all kinds of displays, but especially in head-mounted applications, wherein the system must necessarily be as light and as compact as possible.

The strive for compactness has led to several different complex optical solutions, all of which, on the one hand, are still not sufficiently compact for most practical applications, and, on the other hand, suffer major drawbacks in terms of manufacturability. Furthermore, the eye-motion-box (EMB) of the optical viewing angles resulting from these designs is usually very small—typically less than 8 mm. Hence, the performance of the optical system is very sensitive even to small movements of the optical system relative to the eye of the viewer, and does not allow sufficient pupil motion for conveniently reading text from such displays.

DISCLOSURE OF THE INVENTION

The present invention facilitates the design and fabrication of very compact light-transmitting substrates for, amongst other applications, HMDs. The invention allows relatively wide FOVs together with relatively large EMB values. The resulting optical system offers a large, high-quality image, which also accommodates large movements of the eye. The optical system offered by the present invention is particularly advantageous because it is substantially more compact than state-of-the-art implementations, and yet it can be readily incorporated, even into optical systems having specialized configurations.

A further application of the present invention is a compact display with a wide FOV for mobile, hand-held application, such as cellular phones. In today's wireless internet-access market, sufficient bandwidth is available for full video transmission. The limiting factor remains the quality of the display within the device of the end-user. The mobility requirement restricts the physical size of the displays, and the result is a direct-display with poor image viewing quality. The present invention enables a physically, very compact display with a large virtual image, which is a key feature in mobile communications, and especially for mobile internet access, solving one of the main limitations for its practical implementation. As such, the present invention enables the viewing of the digital content of a full format internet page within a small, hand-held device, such as a cellular phone.

A broad object of the present invention is therefore to alleviate the drawbacks of state-of-the-art compact optical display devices and to provide other optical components and systems having improved performance, according to specific requirements.

In accordance with the present invention there is therefore provided an optical device comprising a light-transmitting substrate having a refractive index, at least two major surfaces and edges, an optical element for coupling light waves into the substrate for effecting total internal reflection, at least one element carried by said first substrate for coupling light waves out of the substrate, and a first transparent plate, having at least two major surfaces, one of the major surfaces of the first transparent plate being optically cemented, with a first optical adhesive having a refractive index, to one of the major surfaces of the light-transmitting substrate, defining a first interface surface, light waves coupled inside the substrate are partially reflected from the interface plane and partially pass through it, wherein the refractive index of the optical adhesive is different than the refractive index of the light transmitting substrate.

In accordance with the present invention there is also provided an optical device, comprising an input aperture, an output aperture, a partial input aperture which covers an internal part of said input aperture wherein the area of the partial input aperture is substantially smaller than the area of the input aperture, a first light-transmitting substrate having at least two major surfaces and edges, an optical element for coupling light waves into the substrate by total internal reflection, at least one element carried by said first substrate for coupling light waves out of the substrate, and a beam-splitting arrangement, characterized in light waves which are coupled into the substrate through the partial input aperture, are partially reflected from the beam-splitting arrangement at least once and coupled out from the substrate through the entire area of the output aperture.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of a prior art exemplary light-transmitting substrate;

FIG. 2 is a schematic sectional view of a light-transmitting substrate with two different impinging rays, wherein the coupling-in element is a reflective surface;

FIG. 3 is another schematic sectional view of a light-transmitting substrate with two different impinging rays, wherein the coupling-in element is a transparent prism attached to the major surface of the substrate;

FIG. 4 is yet another schematic sectional view of a light-transmitting substrate with two different impinging rays, wherein the coupling-in element is a reflective prism attached to the major surface of the substrate;

FIG. 5 is yet another schematic sectional view of a light-transmitting substrate with two different impinging rays, wherein the coupling-in element is a transparent prism attached to a slanted edge of the substrate;

FIG. 6 is a schematic sectional view of a light-transmitting substrate with two different impinging rays, wherein the coupling-in as well as the coupling-out elements are diffractive optical elements;

FIG. 7 is a schematic sectional view of a light-transmitting substrate with two different impinging rays, wherein the coupling-out element is an array of partially reflecting surfaces;

FIG. 8 is a schematic sectional view of a light-transmitting substrate, wherein only part of the input aperture is illuminated by light waves, according to the present invention;

FIG. 9 is a schematic sectional view of a light-transmitting substrate, wherein only part of the input aperture is illuminated by light waves and the coupling-out element is an array of partially reflecting surfaces, according to the present invention;

FIG. 10 is a schematic sectional view of a light-transmitting substrate optically attached to a flat transparent plate, according to the present invention;

FIG. 11 is a schematic sectional view of a light-transmitting substrate optically cemented to a flat transparent plate, wherein the refractive index of the optical adhesive is substantially different than that of the substrate, according to the present invention;

Figure 12:
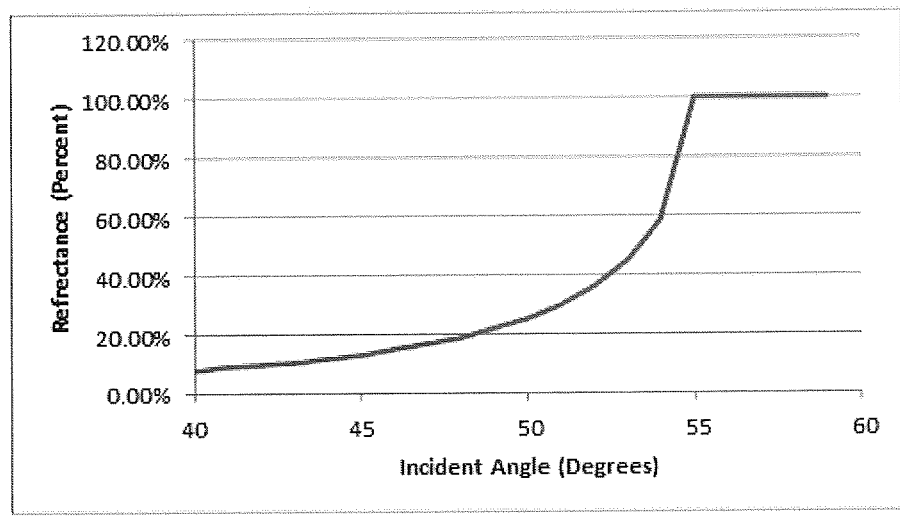
Figure 13:
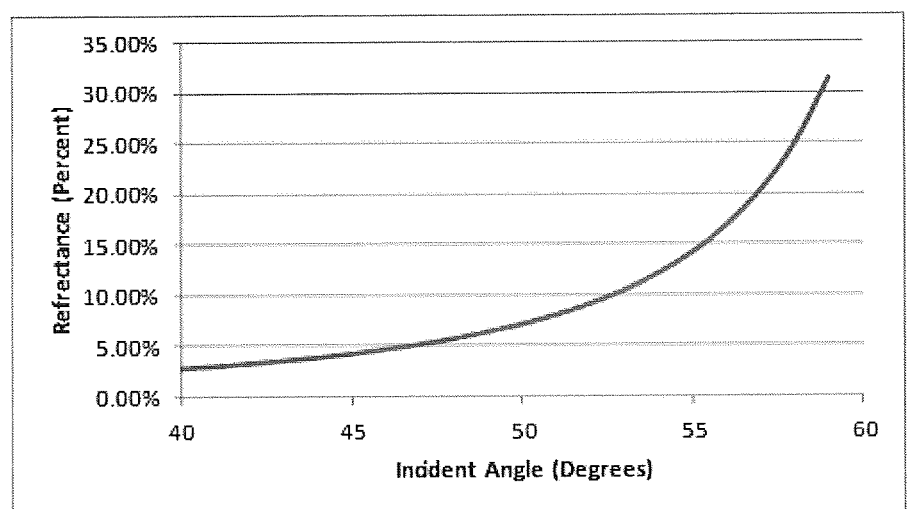
Figure 14:
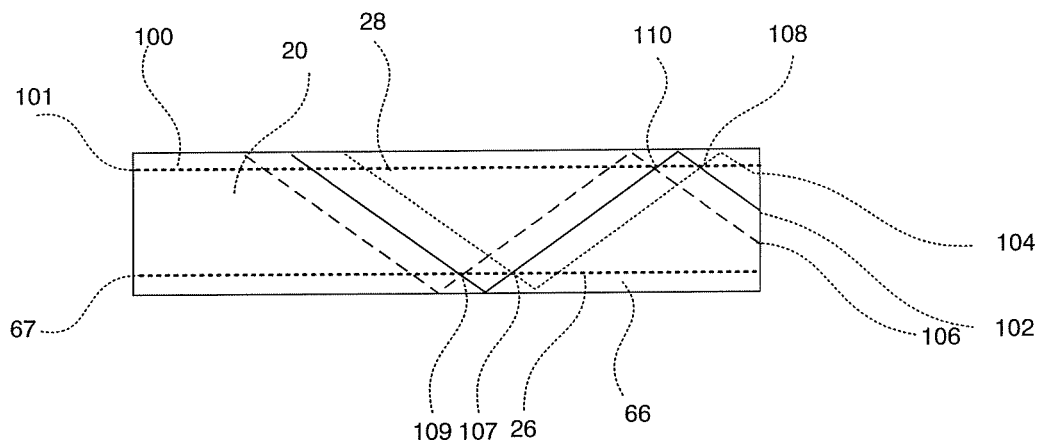
Figure 15A:
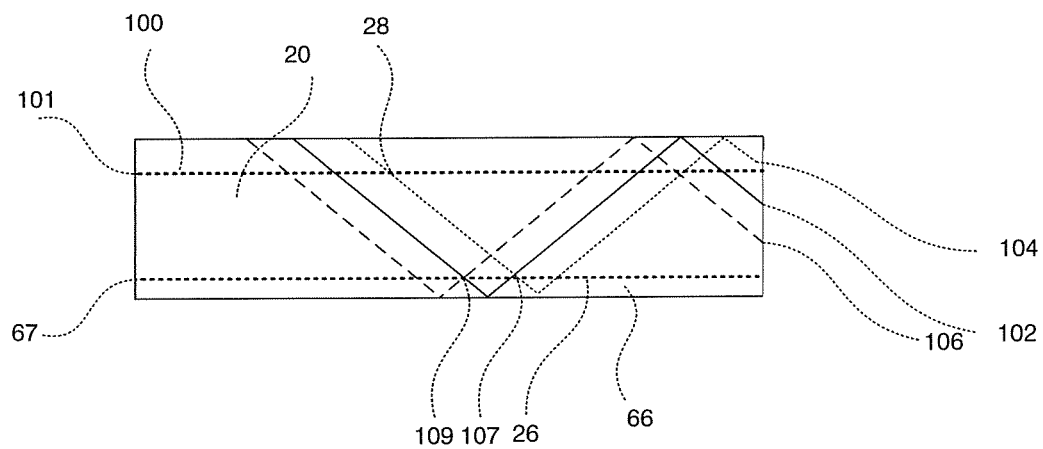
Figure 15B:
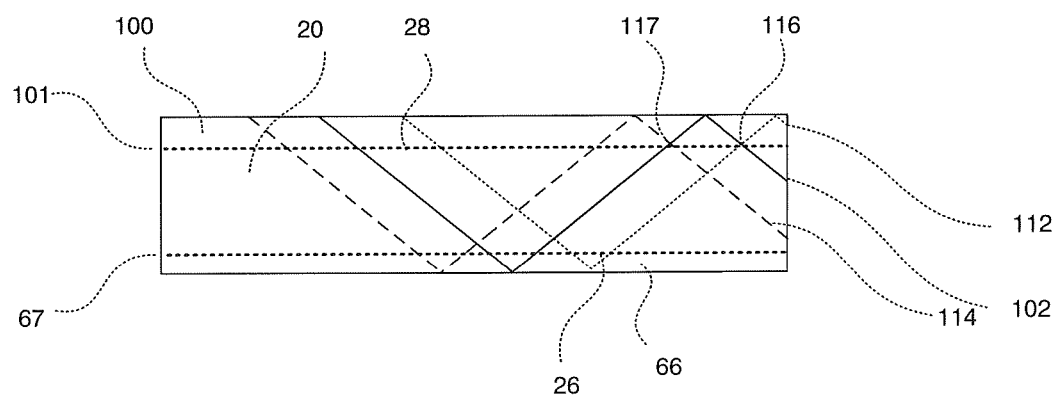
Figure 16A:
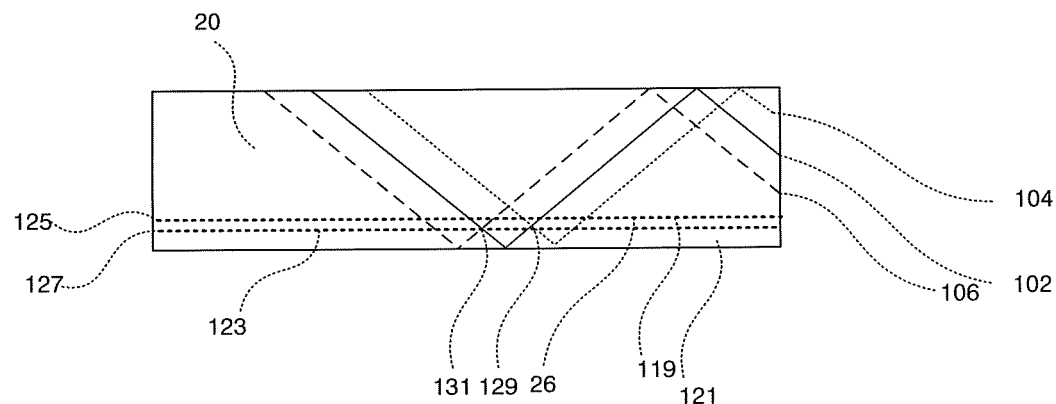
Figure 16B:
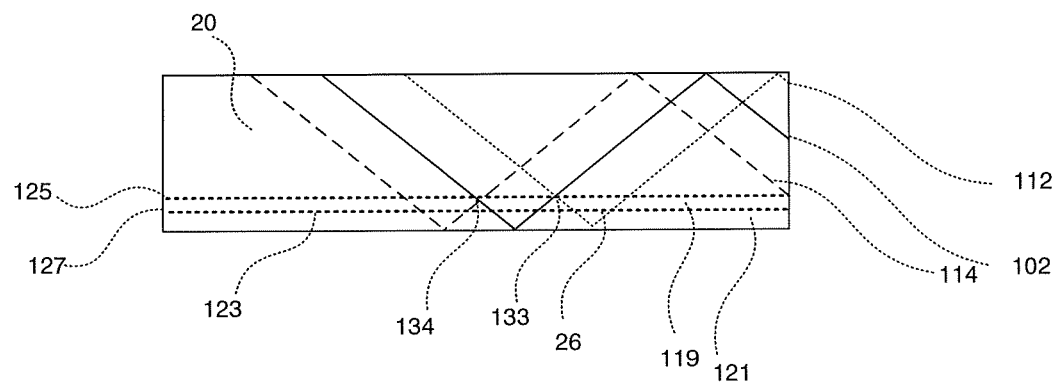
Figure 20:
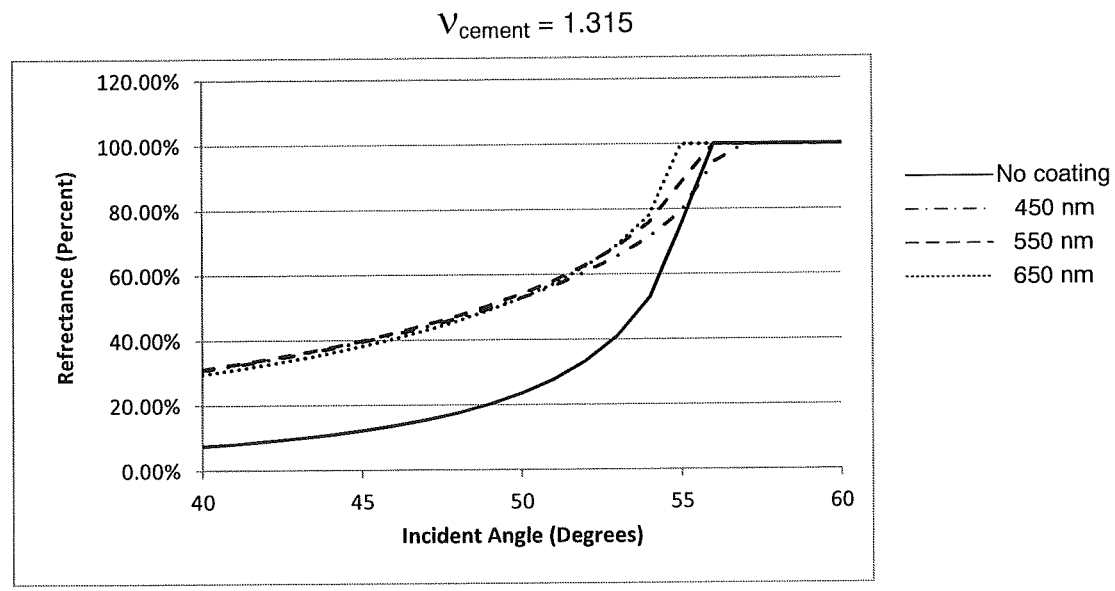
Figure 21:
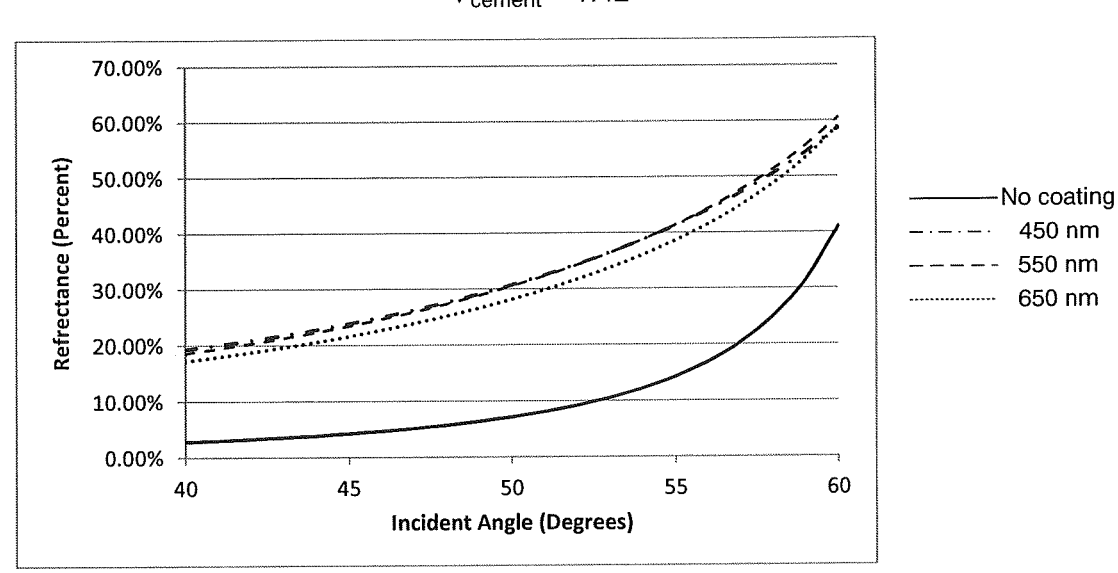
Figure 22:
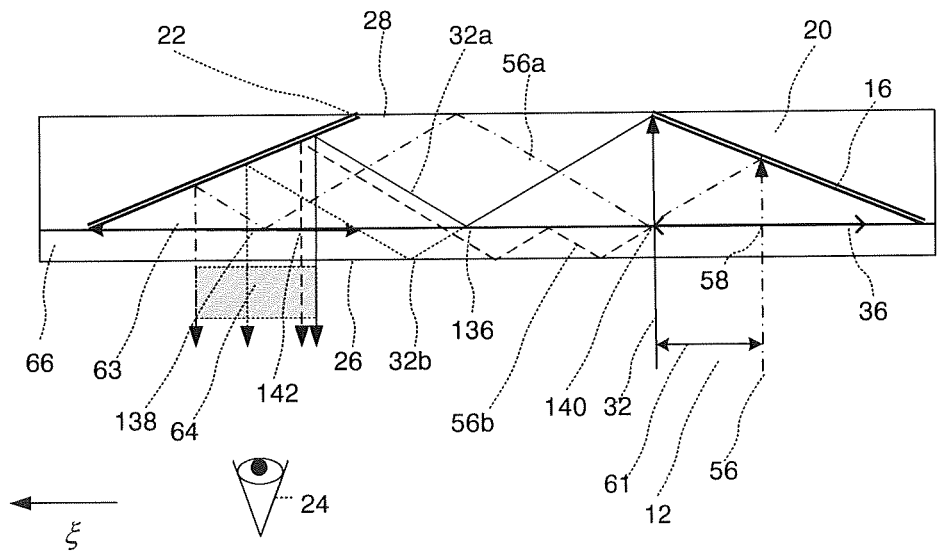
Figure 23:
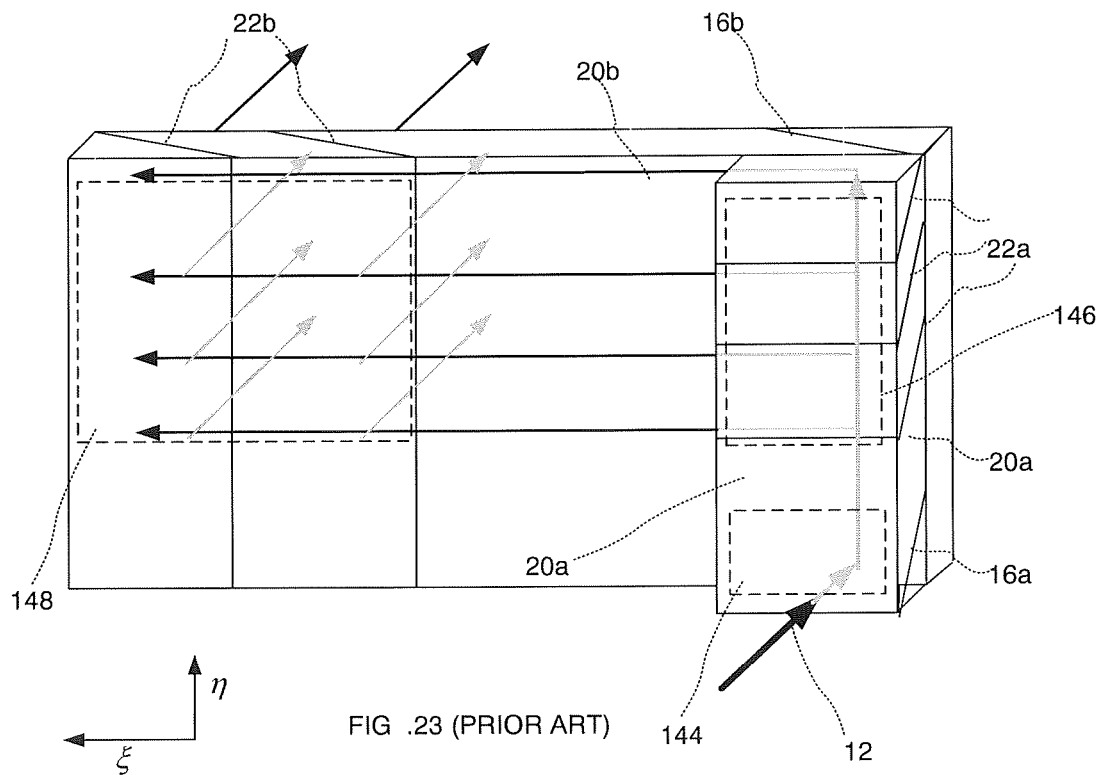
Figure 24:
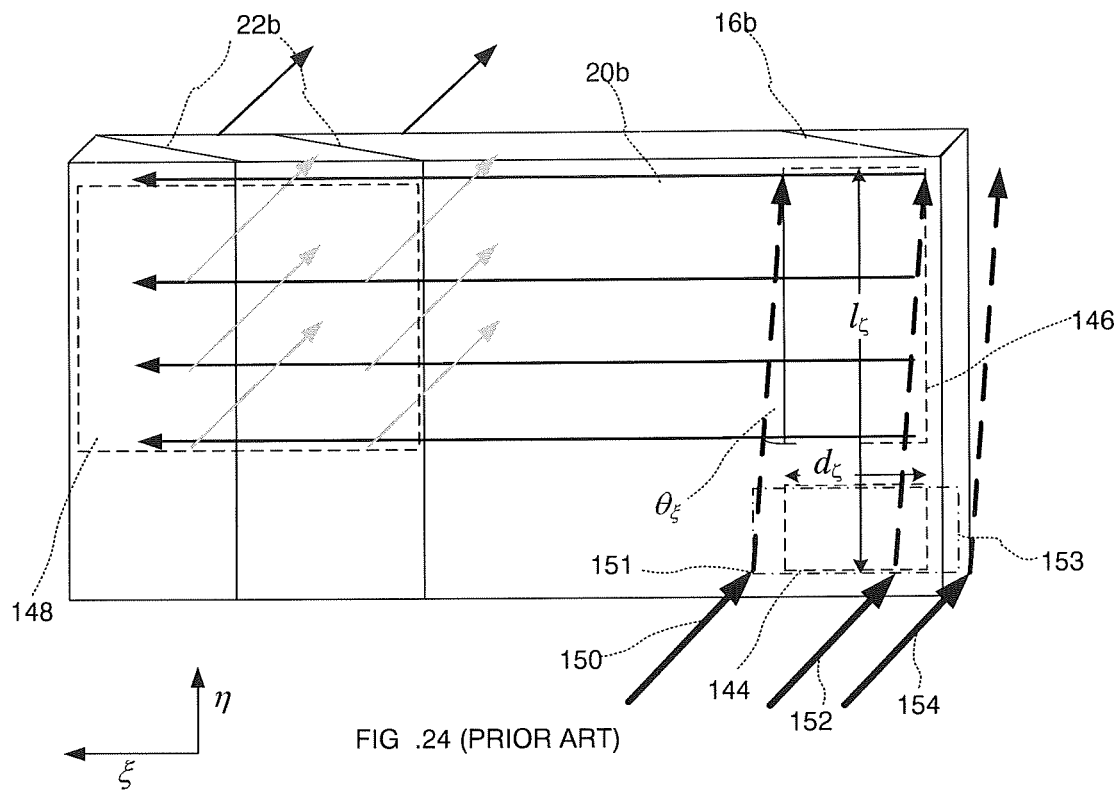
Figure 25:
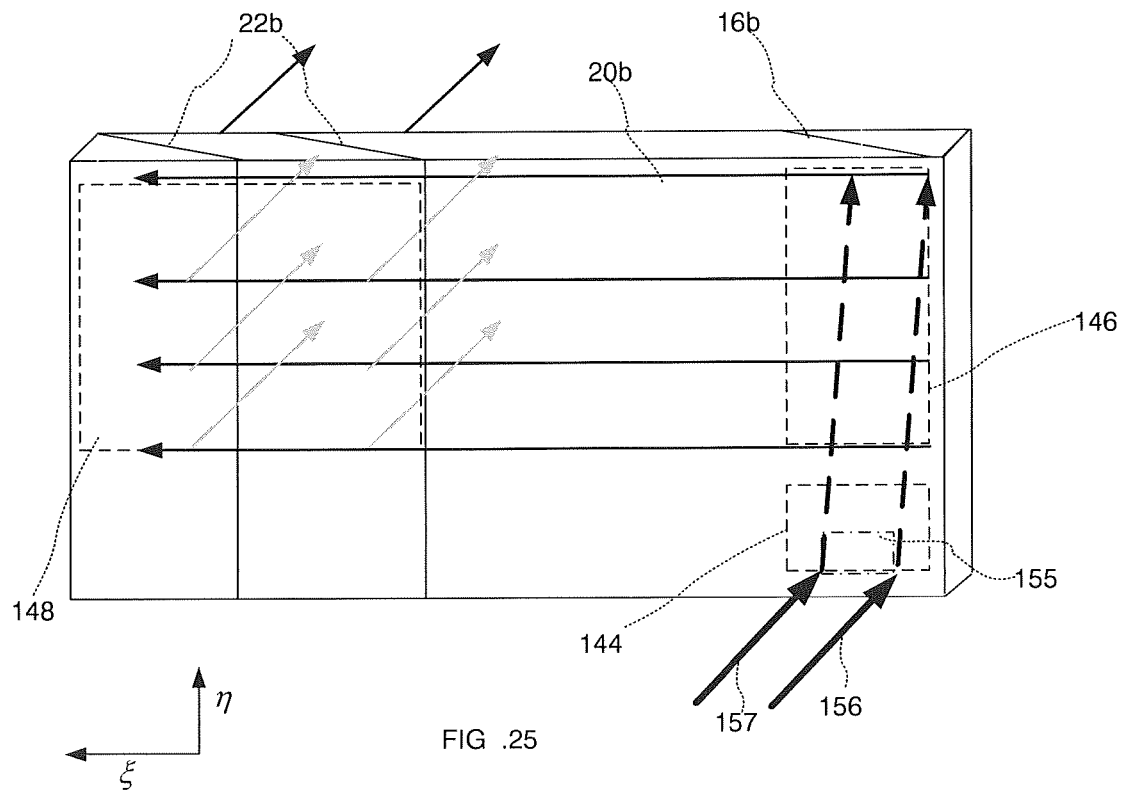

FIGS. 12 and 13 are graphs illustrating the Fresnel reflection coefficients from the interface surface as a function of the incident angle for two different optical adhesives according to the present invention;

FIG. 14 is a schematic sectional view of a light-transmitting substrate optically cemented to two flat transparent plates using two different optical adhesives, according to the present invention;

FIGS. 15*a* and 15*b* are schematic sectional views of a light-transmitting substrate optically cemented to two different flat transparent plates having different thicknesses, according to the present invention;

FIGS. 16*a* and 16*b* are schematic sectional views of a light-transmitting substrate optically cemented at only one of the major surfaces to two different flat transparent plates having different thicknesses, according to the present invention;

FIGS. 17*a*, 17*b*, 18*a*, 18*b*, 19*a* and 19*b* are graphs illustrating the brightness distribution of the input (FIGS. 5, 17*a*, 18*a*, 19*a*) and the output (FIGS. 17*b*, 18*b* and 19*b*) light waves for mixed (solid lines) and non-mixed (dashed lines) light waves for three different incident angles;

FIGS. 20 and 21 are graphs illustrating the Fresnel reflection coefficients from the interface surface as a function of the incident angle for two different optical adhesives, wherein a thin film coating is applied to the interface surface, according to the present invention;

FIG. 22 is a schematic sectional view of a light-transmitting substrate, wherein deliberately only part of the input aperture is illuminated by light waves, and a flat transparent plate is optically attached to the light-transmitting substrate, according to the present invention;

FIG. 23 is a diagram illustrating a prior art method to expand a beam along two axes utilizing a double light-guide optical element configuration;

FIG. 24 is a diagram illustrating a prior art method to expand an image having a finite FOV along two axes utilizing a double light-guide optical element configuration, and FIG. 25 is a diagram illustrating a method for expanding an image having a finite FOV along two axes utilizing a double light-guide optical element configuration wherein only a partial input aperture which is substantially smaller than the area of the input aperture is illuminated by the input light waves.

DETAILED DESCRIPTION

Figure 1:
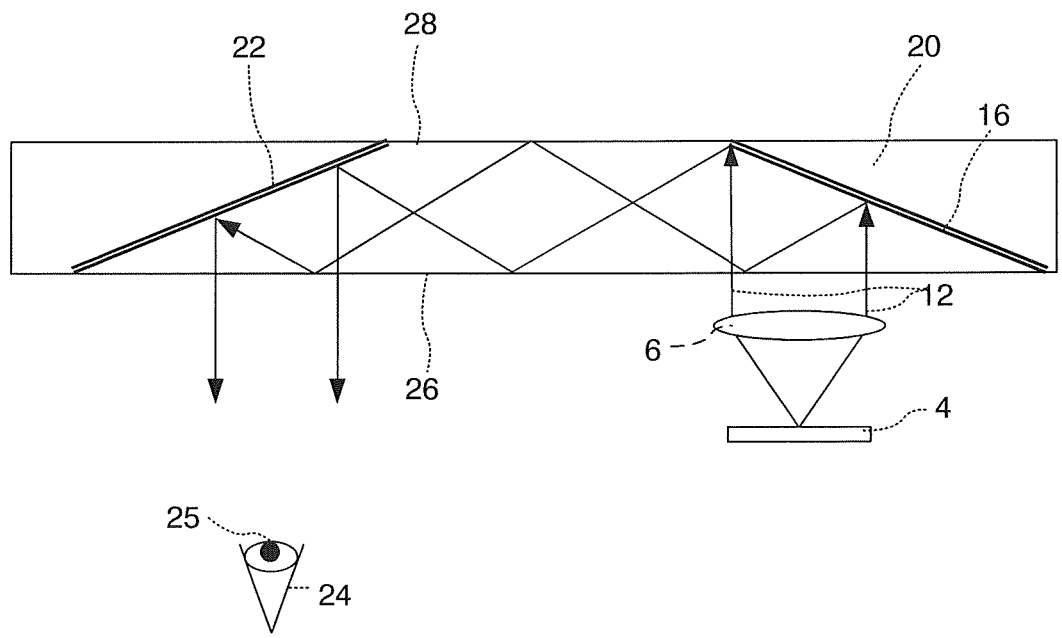

FIG. 1 illustrates a sectional view of a prior art light-transmitting substrate. The first reflecting surface 16 is illuminated by a collimated light wave 12 emanating from a display source 4, and collimated by a lens 6 located between the source 4 and a substrate 20 of the device. The reflecting surface 16 reflects the incident light from the source such that the light wave is trapped inside the planar substrate 20, by total internal reflection. After several reflections off the major surfaces 26, 28 of the substrate 20, the trapped light waves reach a reflective element 22, which couple the light out of the substrate into the eye 24, having a pupil 25, of a viewer. Herein, the input surface of the substrate will be defined as the surface through which the input light waves enter the substrate, and the output surface of the substrate will be defined as the surface through which the trapped light waves exit the substrate. In the case of the substrate illustrated in FIG. 1, both the input and the output surfaces coincide with the lower surface 26. Other configurations are envisioned, however, in which the input and the image light waves from the displace source 4 are located on opposite sides of the substrate, or on one of the edges of the substrate. Usually, the output aperture of the optical system is defined as the area on the output surface of the substrate 20 where the coupled-out light waves pass through after being reflected by the reflecting surface 22 (or the reflecting surfaces described in the embodiments hereafter). The input aperture of the optical system here is defined by tracing the coupled-out light waves from the output aperture back to the input surface of the substrate 20.

An important issue to be taken into account is the uniformity of the output light waves which are coupled out from the substrate. To avoid an image with gaps or stripes, it is desired that the trapped light waves cover the entire area of the substrate.

A main source for unevenness of the image can be the non-uniformity of the image waves which are coupled into the substrate. Usually, when two edges of a display source have slightly different intensities, this will hardly be noticed by the viewer, if at all. This situation is completely different for an image which is coupled inside a substrate by total internal reflection.

Figure 2:
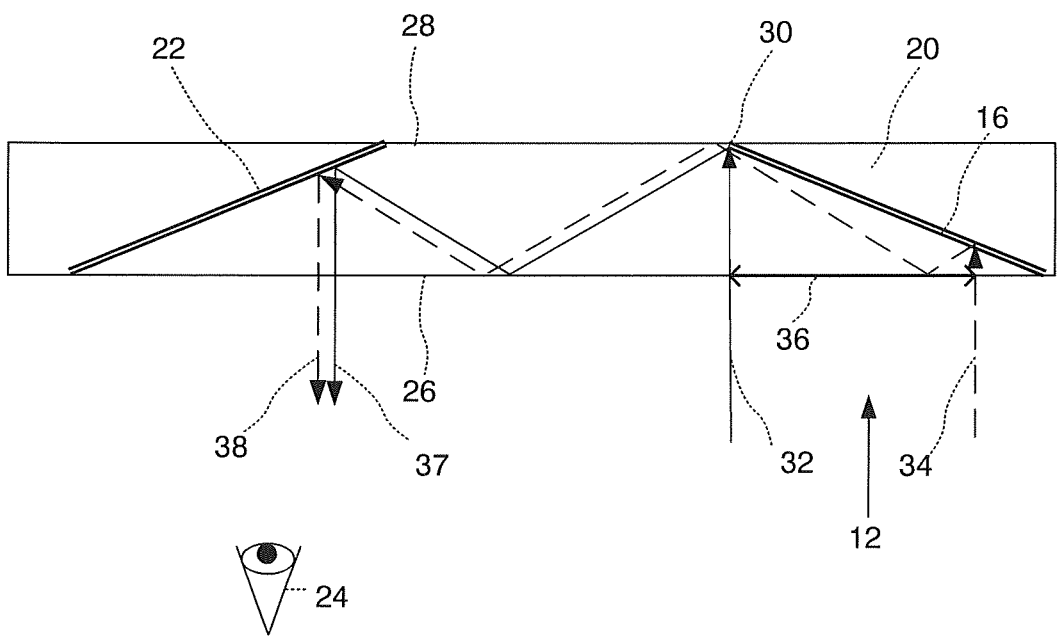
Figure 3:
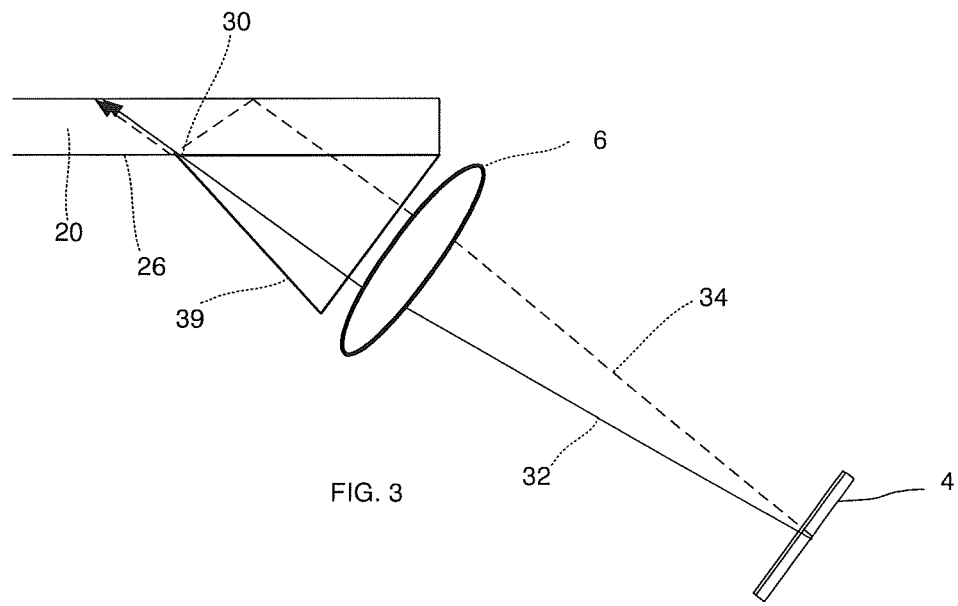
Figure 4:
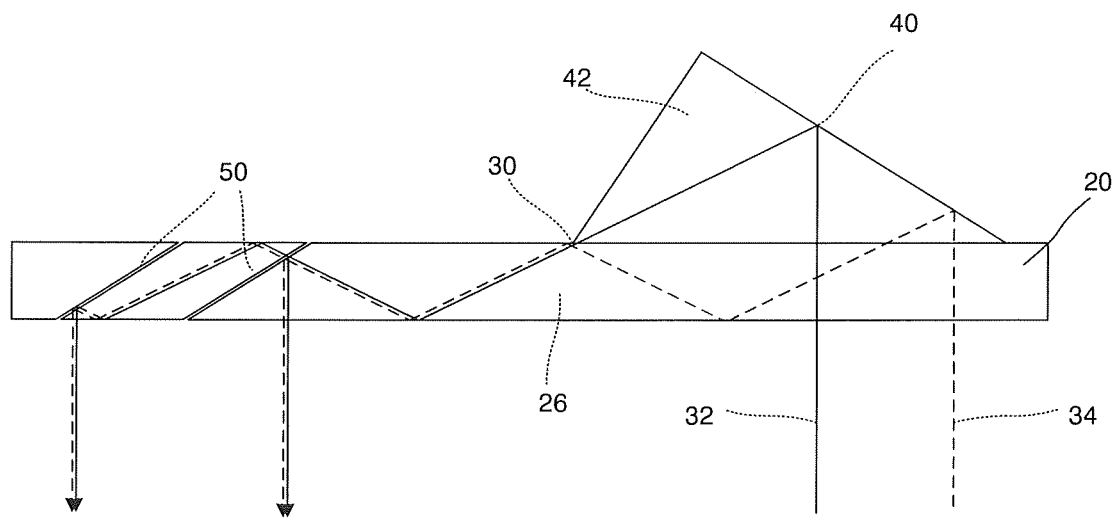
Figure 5:
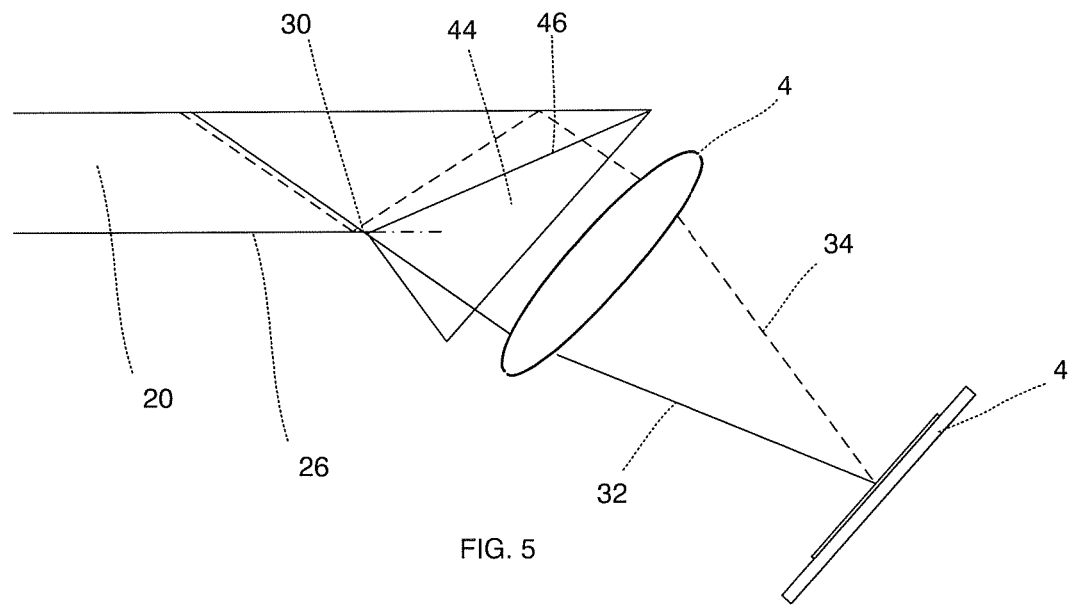
Figure 6:
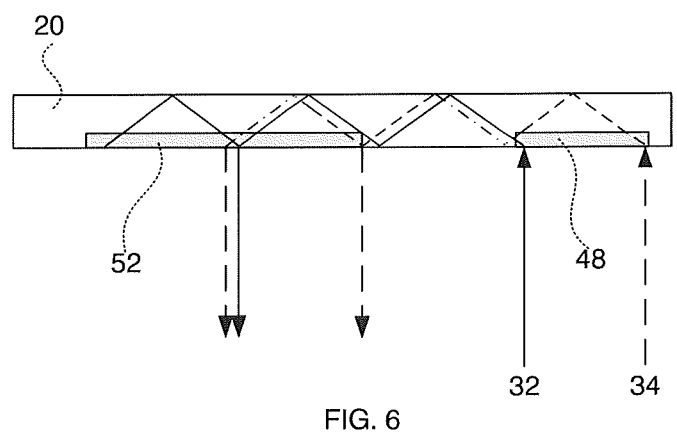

As illustrated in FIG. 2, two rays, 32 (solid line) and 34 (dashed line), are located at the edges of the plane wave 12, which originate from the same point in the display source 4 and impinge on the edges of the input aperture 36. Assuming that the brightness of ray 34 is lower than that of ray 32 as a result of a non-perfect imaging system, this non-similarity will hardly be seen by a direct viewing of the plane wave 12, as a result of the remoteness between the rays. After being coupled into the substrate 20, however, this condition is changed. While the ray 32 illuminates the reflecting surface 16 just on the interface line 30 between the reflecting surface 16 and the upper major surface 28, the right ray 34 is reflected from surface 16, totally reflected from the lower surface 26, and then impinges on the upper surface 28 just left to the interface line 30. As a result, the two rays 32 and 34 propagate inside the substrate 20 adjacent to each other. The two exit rays 37 and 38 which originated from rays 32 and 34, respectively, and reflected from surface 22 accordingly, have a different brightness. Unlike the input light wave 12, however, now the two different rays are adjacent to each other, and this dissimilarity will easily be seen as a dark line in the image. These two rays 37, 38 will continue to propagate together, adjacent to each other, inside the substrate and will create a dark line wherever they will be coupled out together. The best way to avoid this unevenness is to assure that all the coupled light waves into the substrate have a uniform brightness over the entire input aperture for the entire FOV. This demand might be very difficult to fulfil for systems having large FOVs, as well as wide input apertures.

The embodiment described above in relation to FIGS. 1-2 is an example of a method for coupling the input waves into the substrate using a reflective surface 16 which is embedded inside the substrate 20. As illustrated in FIGS. 3-6, the input waves could, however, also be coupled into the substrate by other optical means, including (but not limited to) a transparent prism 39, which is optically attached to a major surface 26 of the substrate 20 (FIG. 3); a reflecting external surface 40 of a folding prism 42, which is optically attached to a major surface 26 of the substrate 20 (FIG. 4); an intermediate prism 44, which is attached to a slanted edge 46 of the substrate 20 (FIG. 5); a diffractive grating element 48, which is embedded on the substrate (FIG. 6), or by other solutions. In addition, the coupling-out element illustrated in FIGS. 1-2 is a single reflective element 22. The input waves could, however, also be coupled out from the substrate by other optical means, including (but not limited to) a single partially reflecting surface, an array of partially reflecting surfaces 50 (FIG. 4), a diffractive grating element 52 (FIG. 6) which is embedded on the substrate, and by other solutions.

The common characteristic of all of these embodiments is that the boundary line 30 between the edge of the coupling-in element and the major surface of the substrate 20, should be illuminated for a single light wave by two different marginal rays that enter the input aperture of the substrate in two different locations: a ray 32 that directly illuminates the boundary line 30, and another ray 34 which is first reflected at least once by one of the major surfaces of the substrate 20, prior to illuminating the boundary line. In all of these embodiments, the two marginal rays, 32 and 34, of the input light wave should have substantially the same intensities, otherwise, even a small dissimilarity between the marginal rays, will be easily seen as a sharp discontinuity in the coupled-out image.

Figure 7:
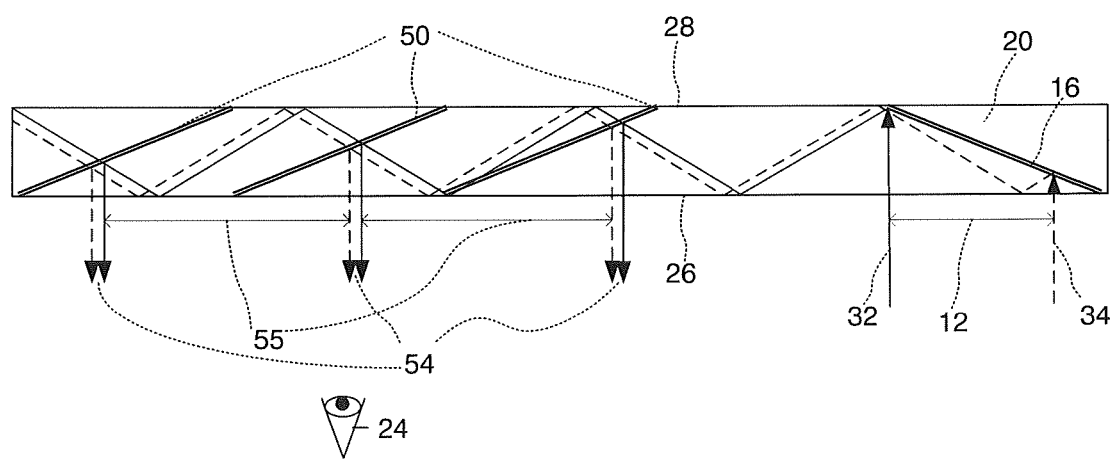

Furthermore, as illustrated in FIG. 7, for substrates having an extended coupling-out aperture (with an array of partially reflecting surfaces, or a diffractive grating, such as a coupling-out element), the input light wave is "duplicated" along the output aperture. The two marginal rays, 32 and 34, will continue to propagate together adjacent to each other inside the substrate, and will create a dark line wherever they will be coupled out together. Therefore, in the case of a dissimilarity between the marginal rays 32 and 34, the border lines 54 between the "duplicated" output light waves 55, will be seen as an array of dark lines in the image.

Figure 8:
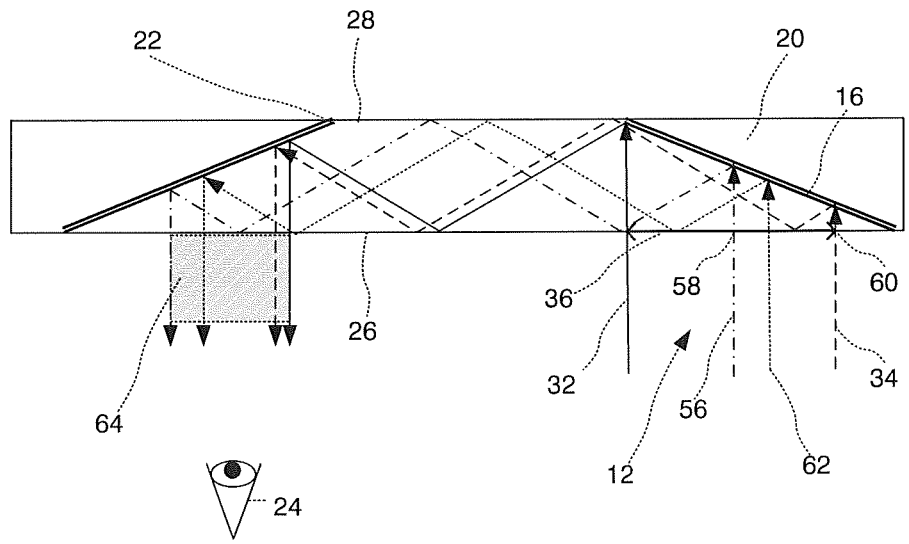

The non-uniformity phenomenon gets even worse in cases where the entire area of the input aperture of the substrate is not fully illuminated. As illustrated in FIG. 8, only part of the input aperture 36 is illuminated by the input light wave 12. The rightmost ray of the input light wave is no longer ray 34, but rather ray 56 (dotted-dashed line) impinging on the input aperture at a point 58, which is positioned leftward to the edge 60 of the aperture 36. As a result, all the rays that should have impinged on the input aperture between points 58 and 60, such as ray 62 (dotted line), will be missing from the image, and consequently, a wide black stripe 64 will be seen in the image.

Figure 9:
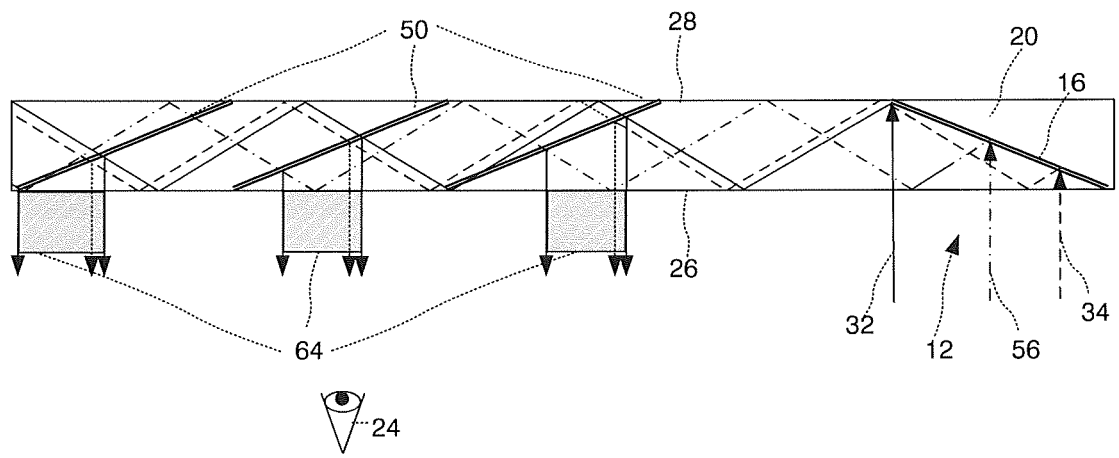

As illustrated in FIG. 9, for substrates having an extended coupling-out aperture, the black stripe is "duplicated" along the output aperture and the image will be seen as having an array of black stripes.

In order to solve the unevenness problem of the image which is coupled out from the substrate, it is important to understand the difference between this problem and an unevenness problem of a conventional display source, which emits a real image from the display plane. Generally, an uneven image, which is projected from a conventional display source, is caused by a non-uniformity of the display itself, namely, different pixels of the display emit light waves having different intensities. As a result, the only way to solve the unevenness problem is to directly manage the pixels of the display. The cause for the unevenness of the image illustrated hereinbefore in relation to FIGS. 7-9, however, is completely different. Here, the unevenness is caused by a non-uniformity of the different rays of a single light wave associated with a single pixel in the image. That is to say, different rays belonging to the same light wave, and since this is a plane wave, they have the same direction and different intensities. The unevenness of this plane wave can be solved if the various rays of this uneven wave will be mixed together, and therefore, a proper mixing arrangement should be added to the substrate, in order to improve the uniformity of the plane waves trapped inside the substrate by total internal reflection.

Figure 10:
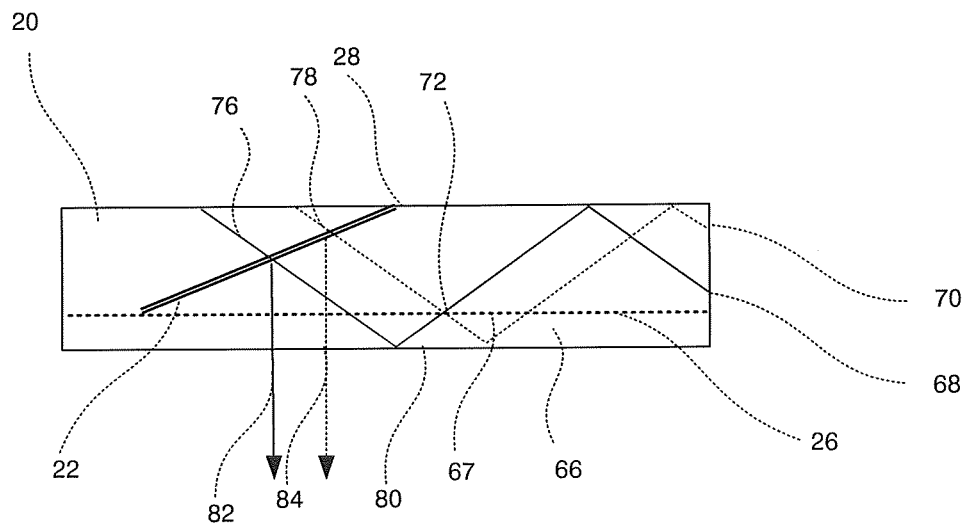

Referring to FIG. 10, this unevenness problem may be solved by optically attaching a flat transparent plate 66 to one of the major surfaces, e.g., surface 26 of the substrate 20, forming a beam-splitting arrangement at the interface plane 67 between the substrate 20 and the transparent plate 66. As illustrated, two light rays, 68 and 70, having different intensities, are coupled into the substrate 20. These two rays intersect each other at point 72, which is located at the interface plane 67. Due to the beam-splitting arrangement applied thereto, each one of the two intersecting rays is partially reflected and partially passes through the interface plane. Consequently, the two rays interchange energies between themselves and the emerging rays 76 and 78 from the intersection point 72 have intensities which are closer to the average intensity of the two incident rays 68 and 70. The most efficient beam-splitting arrangement is to apply a partially reflecting coating to the interface plane, wherein half of the incoming light wave is transmitted, and half is reflected from the surface. In such a case, the intensities of the emerging rays 76 and 78 are substantially the average intensity of the two incident rays 68 and 70 and the mixing between the rays is optimal.

The main drawback of the coating method, however, is that in order to avoid aberrations and smearing of the image, the direction of the trapped rays inside the substrate should be strictly retained. Therefore, a high degree of parallelism should be maintained for the three reflecting surfaces: the upper major surface 28 of the substrate 20, the lower surface 80 of the plate 66 and the interface plane 67. As a result, the external surfaces of the substrate 20 and the plate 66 should have high parallelism and very good optical quality before connecting them to each other. Applying an optical coating, however, to one of these surfaces will require a complicated coating process which usually deforms the surfaces of the coated plate, especially if this plate is particularly thin. Another problem is that the light rays 82, 84, reflected from surface 22, intersect the interface surface 67 prior to being coupled out from the substrate 20. As a result, a simple reflecting coating cannot easily be applied to surface 67, since this surface should also be transparent to the light-waves that exit the substrate 20, as well as transparent to the light wave from the external scene for see-through applications. This means that the light-waves should pass through plane 67, without substantial reflections at small incident angles, and be partially reflected at higher incident angles. This requirement complicates the coating procedure and increases the probability that the coated plate will be deformed during the coating process. Consequently, since even a minor deformation will deteriorate the performance of the imaging system, an alternative mixing arrangement should be applied.

Figure 11:
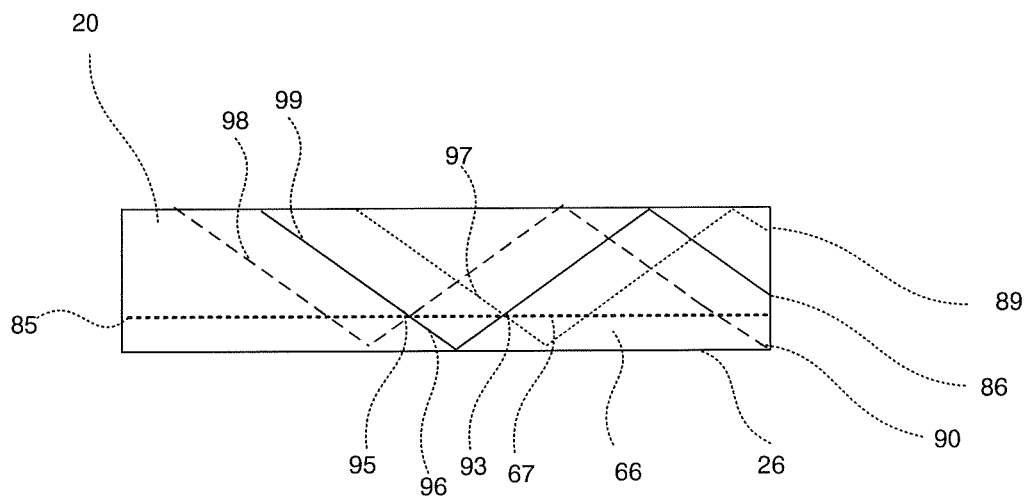

An alternative embodiment is illustrated in FIG. 11, wherein the substrate 20 and the plate 66 are optically cemented using an optical adhesive 85 having a refractive index which is substantially different than the refractive index of the light transmitting substrate 20 and of the flat plate 66. As a result of the differences between the refractive indices and the oblique incident angles of the trapped rays, as compared to the interface plane 67, the Fresnel reflections from plane 67 will be significant and the light waves which are coupled inside the substrate, will be partially reflected from the interface plane. Practically, the incident rays are actually reflected twice from the interface plane 67, once from the interface plane between the substrate 20 and the adhesive 85, and the second time from the interface plane between the optical adhesive 85 and the transparent plate 66. As illustrated, three different rays 86, 89 and 90, each having different intensities, are trapped inside the substrate. The two rays 86 and 89 intersect each other at point 93, which is located at the interface plane 67. As a result of the Fresnel reflections, each one of the two intersecting rays is partially reflected and partially passes through the interface plane. Consequently, the two rays interchange energies amongst themselves, and the emerging rays 96 and 97 from the intersection point 93 have intensities which are closer to the average intensity of the two incident rays 86 and 89. Similarly, the two rays 90 and 96 intersect each other at point 95, interchange energies between themselves, and the emerging rays 98 and 99 from the intersection point 95, have intensities which are closer to the average intensity of the two incident rays 90 and 96, so that the three rays, 86, 89 and 90, interchange energies during this process, and their intensities are now closer to the average intensity. Rays 89 and 90 do not interchange energies directly, but rather indirectly through the two separate interactions with ray 86 at points 93 and 95, respectively.

The optimal mixing will be achieved if the Fresnel reflections from the interface plane 67 are close to 50%. Since Fresnel reflections are very sensitive to the incident angle, it is impossible to find an optical adhesive having a refractive index that yields Fresnel reflection of 50% for the entire FOV of the coupled image. Since, however, the trapped rays intersect not only once, but rather many times with the interface plane 67, it is possible to find a mixing arrangement that will be acceptable even for Fresnel reflections which are very different than the optimal value of 50%. The proposed mixing arrangement is described for an optical system having the following parameters: the thickness of the substrate is $d_s$=1.5 mm; the thickness of the transparent plate is $d_p$=0.2 mm; the refractive index of the substrate and the plate is $v_s$=1.6; the lateral dimension of the output aperture of the substrate is $D_o$=20 mm; the distance between the output aperture and the input aperture is $D_f$=20 mm (that is, the distance between the input aperture and the far edge of the output aperture is 40 mm) and the incident angles of the trapped light waves inside the substrate compared to the normal to the substrate major planes are between 40° and 60°. In addition, since it has been shown that the preferred polarization for the trapped light waves inside the substrate is the s-polarization (see WO 2008/129539), it is assumed here that all of the light waves are s-polarized.

In order to have significant Fresnel reflections, it will be advantageous to find an optical cement having a refractive index which is substantially different than 1.6. Usually, it is difficult to find an optical adhesive having a very high refractive index. Concerning the adhesives having a small refractive index, one that can be commercially available is NOA 1315 (of Norland Products), having a refractive index of 1.315.

FIG. 12 illustrates the reflection from the substrate-adhesive-plate interface planes as a function of the incident angle of the impinging ray. As shown, the reflection is below 15% for the incident angles lower than 48°, has reasonable values between 15% and 60% for the intermediate region between 48° and 55°, and there is a totally internal reflection for incident angles above 55°. The rays having lower incident angles also have a shorter propagation cycle distance inside the substrate, where the propagation cycle distance is defined as $D_c=2*(d_s+d_p)*\tan(\alpha_{in})$ and $\alpha_{in}$ is the incident angle of the trapped ray on the interface plane. In addition, these rays are coupled out to reach the viewer's eye at the far edge of the output aperture of the substrate. As a result, these rays usually encounter a large number of intersections with the interface plane, which can compensate for the low reflection at each intersection point. The situation is more severe for the light waves having higher incident angles that encounter total internal reflection, and hence, there is no mixing effect therefor.

An alternative approach it to use a different optical adhesive having a higher refractive index which is closer to that of the substrate. FIG. 13 illustrates the reflection from the substrate-adhesive-plate interface planes as a function of the incident angle of the impinging ray for the optical adhesive NOA 142 having a refractive index of 1.42. As shown, the reflection is below 15% for the incident angles lower than 55°, and have reasonable values between 15% and 35% for incident angles above 55°. As a result, NOA 1315 is more suitable for the angular range between 40° and 55°, while NOA 142 is appropriate for the angular range above 55°.

The method for attaching a transparent plate to one of the major surfaces of the substrate is not limited to a single plate only. FIG. 14 illustrates a configuration where two different plates, 66 and 100, are optically cemented to the lower 26 and the upper 28 major surfaces of the substrate 20 by the adhesives NOA 142 and NOA 1315, defining the interface planes 67 and 101, respectively. The plates 66 and 100 have a thickness of $d_p=0.2$ mm and the same refractive index 1.6 as the substrate 20. As shown, three different rays, 102, 104 and 106, each having different intensities, are trapped inside the substrate. For rays having incident angles lower than 55°, the two rays 102 and 104 intersect each other at points 107 and 108, which are located at the interface planes 67 and 101, respectively, and the rays 102 and 106 intersect each other at points 109 and 110, which are located at the interface planes 67 and 101, respectively. For rays having incident angles higher than 55°, the light waves are totally internally reflected from the upper interface plane 101, and the three rays intersect each other only at points 107 and 109 which are located at the interface planes 67. The Fresnel reflections for light waves which impinge substantially normal to the interface plane are <0.7% for plane 67 and <2% for plane 101. Consequently, the attenuation of the coupled out light waves from the substrate, as well as the light waves from the external scene, is negligible.

In the embodiment illustrated in FIG. 14 the thickness of the two transparent plates, 66 and 100, is the same, however, there are cases where it is preferred to use two plates with different thicknesses. FIGS. 15*a* and 15*b* illustrate a configuration wherein the thickness of the upper plate 100 is increased to 0.3 mm. As illustrated in FIG. 15*a* the central ray 102 intersects with rays 104 and 106 only at the lower interface plane 67, but not at the upper interface plane 101. Ray 102 however, as illustrated in FIG. 15*b*, intersects with two other rays, 112 and 114, which are located further away from ray 102, at points 116 and 117, respectively, located at the interface plane 101. That is to say, ray 102 intersects with four different rays during each propagation cycle along the substrate. This embodiment is preferred in situations where the propagation distance is limited, and it is necessary for each ray to intersect with as many different other rays as possible.

In the embodiments illustrated in FIGS. 14, 15*a* and 15*b*, the two transparent plates, 66 and 100, are cemented to the two major surfaces 26 and 28 of the substrate. There are cases, however, in which it is preferred to cement two plates to only one of the major surfaces. FIGS. 16*a* and 16*b* illustrate a configuration wherein a first plate 119, having a thickness of 0.1 mm, is cemented to the lower surface 26 of the substrate, and a second plate 121, having a thickness of 0.2 mm, is cemented to the lower surface 123 of the first plate 119, defining the interface planes 125 and 127, respectively. As illustrated in FIG. 16*a*, the central ray 102 intersect with rays 104 and 106 only at points 129 and 131, located at the lower interface plane 127, but not at points which are located at the upper interface plane 125. Ray 102, as illustrated in FIG. 16*b*, however, intersects with two other rays, 112 and 114, which are located further away from ray 102, at points 133 and 134, respectively, located at the interface plane 125. Here again, ray 102 intersects with four different rays during each propagation cycle along the substrate. Generally, the number and the location of the transparent plates which are cemented to the substrate is not limited to two, and the exact number and location where they are cemented, as well as the optical adhesives used, can be determined according to the specific parameters of the optical system.

In the embodiments illustrated in FIGS. 11-16 it is assumed that the transparent plates have the same refractive index as that of the substrate. In some cases, however, it is preferred to choose a plate having a completely different material than that of the substrate. If there is a constraint on the optical adhesive that requires it to have a refractive index similar to that of the substrate, it will be preferred to use a plate having a material with a totally different refractive index. In such a case, most of the mixing effect will be achieved by the interface surface between the adhesive and the plate. In another case, there might be a constraint that the external plate close to the viewer's eye should be fabricated from a polymer material, whereas the substrate itself has to be fabricated from a silicate material. In any case, the exact refractive indices of the transparent plates can be decided according to the various requirements of the systems.

Figure 17A:
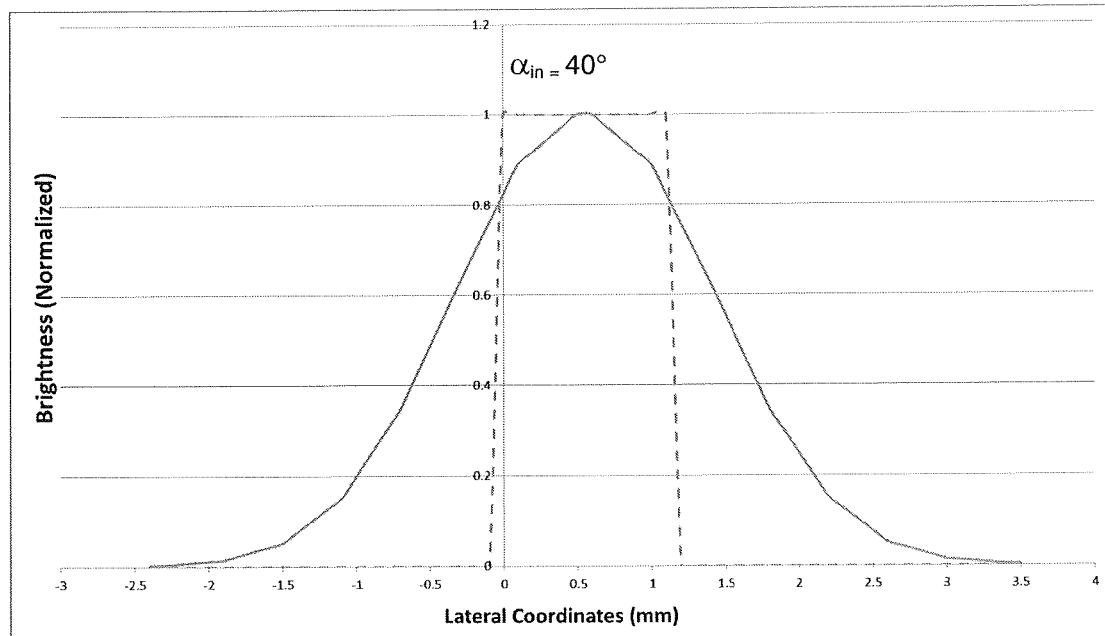
Figure 17B:
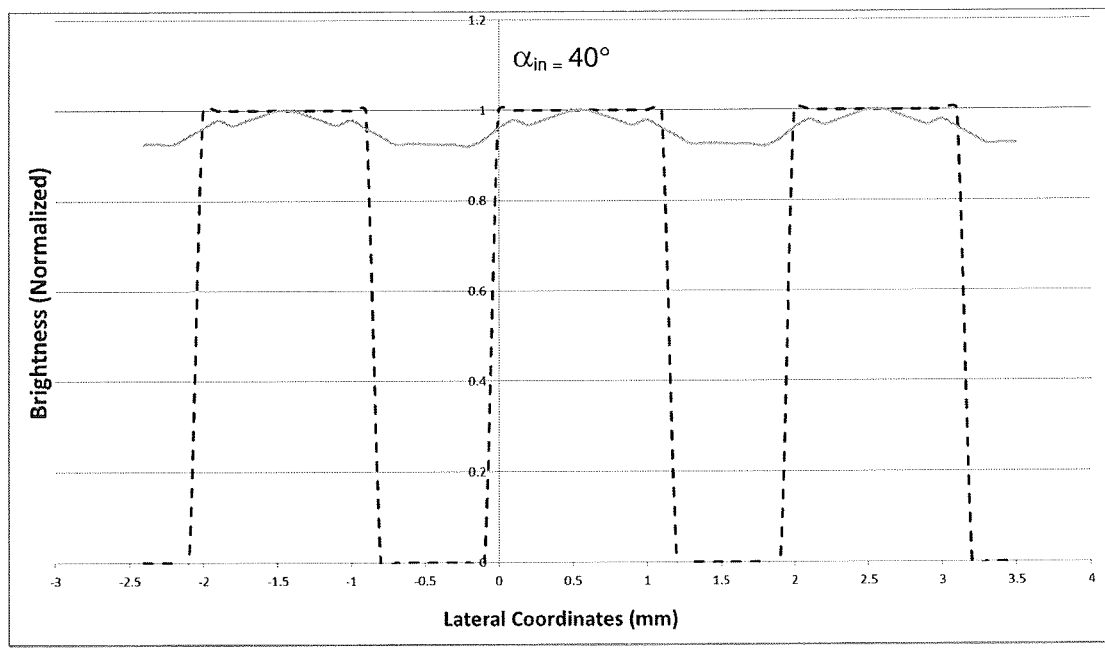
Figure 18A:
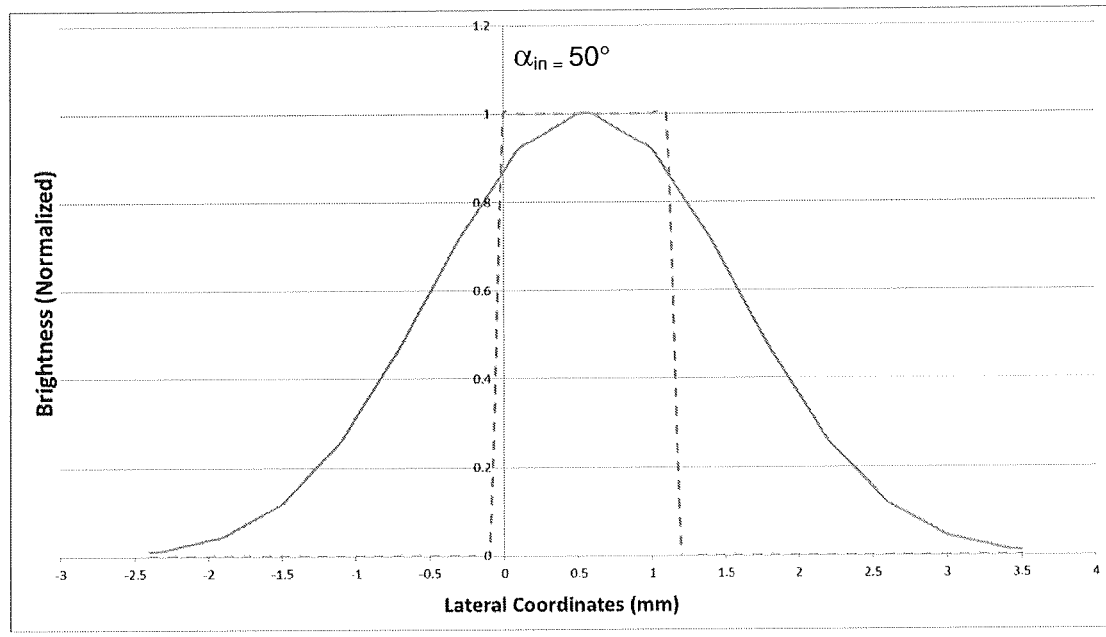
Figure 18B:
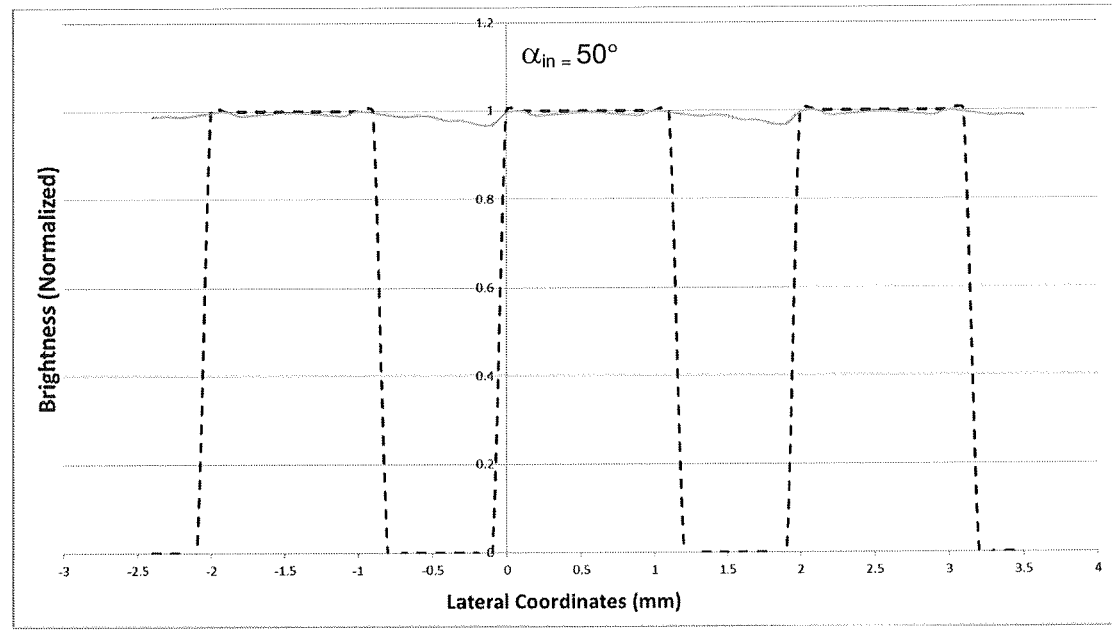
Figure 19A:
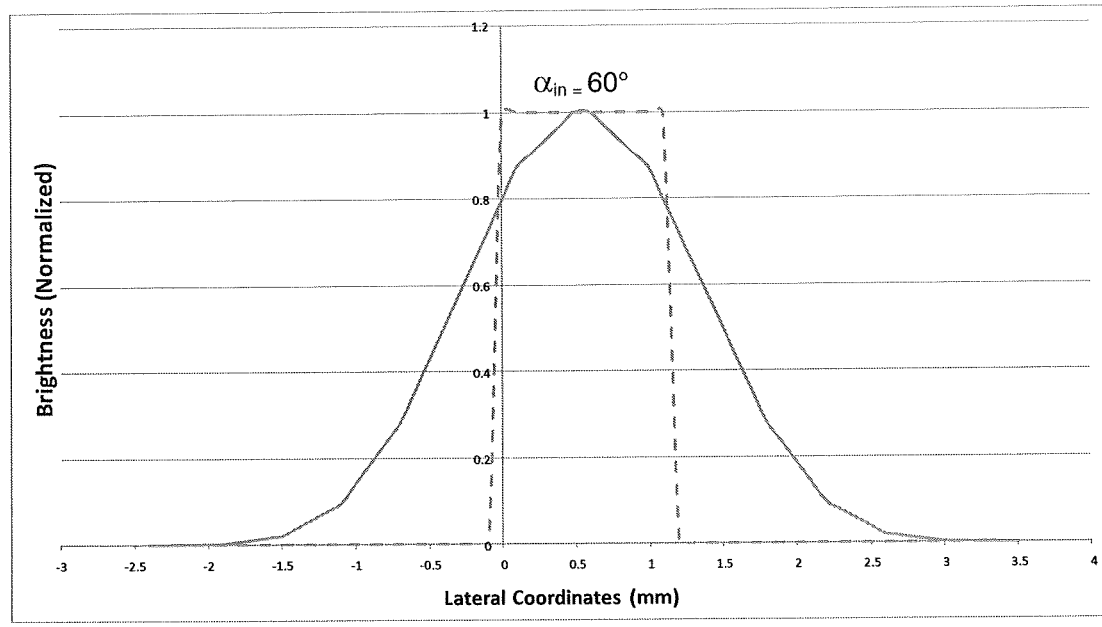
Figure 19B:
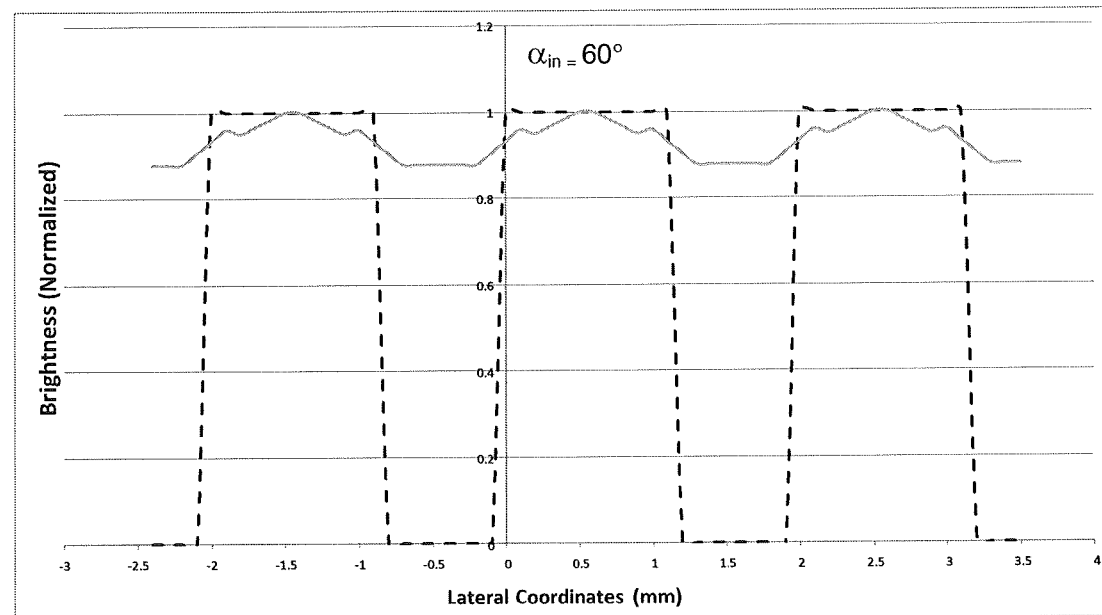

The mixing arrangement described in this application is simulated for the embodiment illustrated in relation for FIG. 14. The results of the simulations are illustrated in FIGS. 17*a*, 17*b*, 18*a*, 18*b*, 19*a* and 19*b* for three different incident angles respectively: $\alpha_{in}=40°$ (FIGS. 17*a* and 17*b*), where the propagation cycle distance is 3.2 mm and each ray encounters an average number of 25 intersections with each interface plane; $\alpha_{in}=50°$ (FIGS. 18*a* and 18*b*), where the propagation cycle distance is 4.5 mm and each ray encounters an average number of 14 intersections with each interface plane, and $\alpha_{in}=60°$ (FIGS. 19*a* and 19*b*), where the propagation cycle distance is 5.8 mm and each ray encounter an average number of 6 intersections with only the lower interface plane 67. The simulations were performed for an extreme case where only 55% of the input aperture is evenly illuminated by the input light waves. Each of FIGS. 17*a*, 18*a* and 19*a* illustrates the brightness distribution of the input light wave, before (dashed line) and after (solid line) the mixing effect of the interface surfaces. FIGS. 17*b*, 18*b* and 19*b* illustrate the brightness distribution of the light wave which is coupled out from the substrate, without (dashed line) and with (solid line) the mixing effect of the interface surfaces, wherein the substrate has an extended output aperture, and consequently, the graphs show the integration of the light waves as a result of the multiplication of the trapped waves inside the substrate. For simplicity, the brightness is normalized to 1 and the propagation cycle distance to 2 mm; only part of the coupled-out light wave is illustrated. As shown, for $\alpha_{in}=40°$, where the mixing effect of each intersection is less significant but the number of intersections is maximal, the brightness of the "mixed" waves at the minimal points falls to ~90% as compared with the maximum brightness where the brightness for the unaffected light waves falls to 0 for 45% of the aperture. For $\alpha_{in}=50°$, where the mixing effect of each intersection has been improved and the number of intersections is still reasonable, the brightness of the "mixed" waves at the minimal points falls to ~97%, and for $\alpha_{in}=60°$, where the mixing effect of each intersection is almost optimal but there is small number of intersections with only one interface plane the brightness of the "mixed" waves at the minimal points falls to ~88%. In all of these cases, however, especially for near-eye displays where the viewer's eye is located a few centimeters from the substrate and integrates the incoming light waves, these minimal droppings of the brightness will hardly be noticed, if at all.

As described above, it was hitherto assumed that the beam-splitting arrangement which should be employed into the optical system was realized utilizing only an optical adhesive layer having a refractive index, which is substantially different than that of the substrate applied at the interface surface between the substrate and a thin transparent plate. As illustrated in relation to FIGS. 10-19, this arrangement is usually sufficient to achieve the required mixing effect. There are cases, however, for instance, where the distance between the input and the output apertures of the substrate is relatively short, or where the non-homogeneities of input light waves impinging on the input aperture are considerably severe, so that this arrangement will not be sufficient to achieve the required mixing effect. On the other hand, as further described hereinabove, achieving the beam-splitting effect utilizing only a coating procedure, imposes many difficulties. In such a case, however, it is possible to utilize an intermediate procedure to achieve the required beam-splitting arrangement, namely, in addition to utilizing an optical adhesive having a refractive index which is substantially different than that of the substrate, a simple enhancing dielectric coating can be applied on the interface surface, either at a surface of the substrate or at a surface of the transparent plate.

There are certain considerations that should be taken into account when selecting the required enhancing coating. First of all, the coating should improve the performance of the mixing arrangement, namely, the ratio between the reflection and the transmission coefficients for the relevant impinging angles should be closer to the optimal value of 1 (i.e., the reflection values from the interface surface should be as close as possible to the transmission values through the interface surface), than that without the coating. In addition, in order to keep the optical qualities of the substrate and the transparent plate, it is important to minimize the deformation of the coated plate as a result of the coating procedure. To achieve this, the applied thin-film coating should be as thin and as simple as possible, namely, only a few thin layers should be utilized, in order to minimize the stress applied at the coated surface, to negligible values. In addition, conventional coating materials should be used to enable a cold-coating process, so that the coated plate will not be deformed during a hot process. In order to simplify the required coating procedure, it is possible to relax some of the requirements stated above. For instance, since there is already a mixing mechanism created by the different refractive index of the adhesive, even without applying the coating, it is possible to apply the coating only on the non-active areas of the substrate, i.e., on the areas not included in the input or the output apertures of the substrate. In such a case, the requirement that the interface surface 67 should be transparent to the light-waves entering or exiting the substrate 20, should not necessarily impose the condition that the applied coating should be substantially transparent at small incident angles. As a result, alleviating this condition will significantly simplify the coating procedure and will help to achieve the conditions described above. The reflection from the coating at small incident angles should not be too high, in order to minimize the attenuating of the external scene. The required maximal reflectance, for the reason set forth hereinabove, should not be very low, since in any event, the external light is attenuated in the active area of the substrate, while passing through the coupling out surfaces 22 of the substrate 20. In addition, it is preferred that the reflected light from the coated surface will have a minimal color effect, but even with these two requirements, however, it will be much easier to materialize the require coating. Another possibility for achieving the required coating with a minimal effect on the coupled-out or the coupled-in light waves is to attach the coated transparent plate on the external major surface of the substrate, such as surface 28 in the embodiment illustrated in FIG. 11, wherein the coating is applied on the entire area of the surface. Here, however, care should also be taken not to attenuate the external scene in the active area too much, and also to avoid the introduction of any color effect to this surface.

The realization of enhancing reflecting coatings applied to the interface surface 67, is illustrated herein with an optical system having the same parameters as those given above in relation to FIGS. 12 and 13. FIG. 20 illustrates the graph of the reflection from the interface surface 67 coated with an appropriate enhancing coating as a function of the incident angle for three different wavelengths: 450 nm (dashed-dotted line), 550 nm (dashed line) and 650 nm (dotted line), when the optical adhesive is NOA 1315 having a refractive index of 1.315 and the solid line represents the reflection of the interface surface 67, without applying the coating as illustrated in FIG. 12. Four thin interlaced layers of the SiO2 and TiO2 materials have been utilized in the device, wherein the total thickness of the coating has a small value of 115 nm. As shown, for the angular range of the incident angles between 40° and 52°, the reflection has been considerably improved from 8% to 36% for an uncoated surface, to reflection values of 30% to 60% for a surface where the enhancing reflecting coating has been applied. For incident angles between 53° and 54°, the reflection is less optimized, and the reflection values are now between 68% and 75% instead of 45% and 60% for uncoated surface, respectively.

FIG. 21 illustrates the graph of the reflection from the interface surface 67 coated with an appropriate enhancing coating as a function of the incident angle for three different wavelengths: 450 nm (dashed-dotted line), 550 nm (dashed line) and 650 nm (dotted line), when the optical adhesive is NOA 142 having a refractive index of 1.42, and the solid line represents the reflection of the interface surface 67, without applying the coating as illustrated in FIG. 13. Four thin interlaced layers of the SiO2 and TiO2 materials have been utilized in the device, wherein the total thickness of the coating has a small value of 112 nm. As shown, for the entire relevant angular range of the incident angles between 40° and 60°, the reflection has been improved considerably from 3% to 41% for an uncoated surface, to reflection values of 19% to 59% for a surface wherein the enhancing reflecting coating has been applied. For optical systems having even moderate values of optical length between the input and the output aperture, a single interface surface having an enhanced reflecting coating as illustrated in FIG. 21, can be utilized for most cases.

Hitherto, it may have been assumed that the beam-splitting arrangement is mainly utilized to correct a non-uniformity illumination of the input aperture, as a result of a non-perfect imaging system. There are situations, however, wherein it will be advantageous to deliberately illuminate with the input light waves, only a part which is substantially smaller than the entire input aperture of the system. For instance, there are systems having wide FOVs and large EMBs, and therefore, a large output aperture is required. In addition, it is desired that the entire optical system will be as compact and simple as possible. As a result, there is a contradiction between the opposing requirements of simultaneously achieving a large output aperture, along with a small input aperture. Consequently, it is necessary to minimize the practical input aperture of the substrate to enable the device and fabrication of a compact and simple collimating module, and therefore, an appropriate method should be found to reduce the input aperture for a given output aperture.

As illustrated in FIG. 22, the collimating module of the system (not shown) is deliberately selected in such a manner that the input light wave 12 illuminates not the entire input aperture 36 of the substrate, but only a partial aperture 61, which is an internal part of the input aperture 36 and its lateral dimension along the axis (i.e., the propagation direction of the central light wave inside the substrate) is substantially smaller than the lateral dimension along the axis of the input aperture 36. As described above in relation to FIG. 8, without utilizing any beam-splitting arrangement, only part of the output aperture 63 is illuminated by the coupled-out light waves, and the entire extent of the aperture 64 will not be illuminated at all. This "empty" aperture 64, however, can be properly illuminated by adding the beam-splitting arrangement of the interface surface 67 between the substrate 20 and the plate 66 to the system. As illustrated, the leftmost ray 32 of the partial aperture 61 impinges on the interface surface 67 at point 136. While part of the ray 32a, is reflected and continues to propagate inside the substrate 20, another part, 32b (dotted line), passes through the interface surface 67 and is coupled out from the substrate at the exit point 138 located inside aperture 64 Similarly, the rightmost ray 56 of the partial aperture 61 impinges on the interface surface 67 at point 140. While part of the ray 56a, is reflected and continues to propagate inside the substrate 20, another part, 56b (dashed line), passes through the interface surface 67 and after two reflections from the bottom surface 26 and another reflection from the interface surface 67, it is coupled out from the substrate at the exit point 142, which is also located inside aperture 64. For simplicity, only two rays having a small number of impingements on the interface surface 67 are illustrated here, but it is clear that by utilizing a proper design, it is possible to fully illuminate the entire output aperture 63 of the substrate with homogeneous output light waves. The "filling" method is illustrated here for the embodiment shown in FIG. 2. It can also eventually be utilized, however, for the other embodiments illustrated in FIGS. 3-7 as well as for other possible optical modules.

As a result of the beam-splitting arrangement of the coupled light waves inside the substrate, the actual dimension of each coupled light wave is expanded along the $\xi$ axis by a factor of $\alpha$, wherein $\alpha$ is the ratio between the lateral dimension along the $\xi$ axis of the input aperture 36 and that of the partial aperture 61. Consequently, the brightness of the coupled-out light waves to the viewer's eye will be reduced by the same factor $\alpha$, accordingly. For back-light or front-light illuminated display sources, (such as LCDs and LCOS, respectively), this brightness decrease can be compensated for by a lower angular divergence of the light wave illuminating the surface of the display source. That is to say, since the light waves now emerging from the display source should be collimated to plane waves having a diameter reduced by a factor of $\alpha$, the angular divergence of the emerging light waves, and consequently the angular divergence of the illuminating light waves, can be reduced accordingly by the same factor of $\alpha$, and hence, the brightness of the output waves can be preserved.

The advantages of reducing the lateral dimension of the input aperture illustrated above in relation to FIG. 22, is even more apparent wherein two-dimensional expansion of the coupled light waves are required. FIG. 23 is a prior art embodiment illustrating a way to expand the beam along two axes utilizing a double substrate configuration. The input wave 12 is coupled through the input aperture 144 into the first substrate 20a, which has a structure similar to the one illustrated in FIG. 1 or 7, by the first reflecting surface 16a, and then propagates along the $\eta$ axis. The partially reflecting surfaces 22a couple the light out of 20a through the output aperture 146 and then the light is coupled into the second main substrate 20b by the reflecting surface 16b through the input aperture, which coincides with the output aperture 146 of the first substrate 20a. The light waves then propagate along the $\xi$ axis and is coupled out by the partially reflecting surfaces 22b through the output aperture 148. As shown, the original beam 12 is expanded along both axes, where the overall expansion is determined by the ratio between the lateral dimensions of the apertures 144 and 148. The rather naïve configuration illustrated in FIG. 23 can be utilized only for optical systems having a very small FOV.

FIG. 24 illustrates a prior art expanding module for an optical system having a more practical FOV. For simplicity the first substrate 20a is not plotted and only its input 144 and output 146 apertures are shown here. The input light wave illustrated here coupled into the substrate 20a, is the marginal light wave in the FOV having an off-axis angle of $f_x$ along the x axis compared to the central light wave. As a result, the angle $\theta_\xi$ between the projection of the coupled light wave on the major surface of the substrate and the $\eta$ axis is $$\sin\theta_\xi = \frac{\sin\phi_\xi}{\nu \cdot \sin\beta_\zeta}. \tag{1}$$

where, $\nu$ is the refractive index of the substrate and $\beta_\zeta$ is the off-axis angle of the coupled light wave inside the substrate, as compared to the normal to the major surfaces of the first substrate 20a. Assuming that the entire input aperture 146 of the substrate 20b should be illuminated by the coupled light waves, in order to illuminate the edge of this aperture, the marginal ray 150 should be coupled into substrate 20a at the point 151 which is located at a distance $$\Delta d_\xi = l_\eta \cdot \tan\theta_\xi, \tag{2}$$

where, $l_\eta$ is the lateral distance along the $\eta$ axis between the external edges of the input 144 and the output 146 apertures of the first substrate 20a. That is to say, the input aperture 144 of the substrate 20a is not wide enough to enable the coupled light wave to illuminate the entire are of the output aperture 146. Hence, also taking into account the other marginal ray in the FOV having the off-axis angle of $-\phi_\xi$ along the $\xi$ axis, the lateral dimension $d_\xi$ of the input aperture 144 should be extended by $2 \cdot \Delta d_\xi$ to yield a larger input aperture 153 having a lateral dimension of $d_\xi + 2 \cdot \Delta d_\xi$. In addition, all the rays that couple into the substrate rightward to ray 152, which is coupled out from substrate 20a at the right edge of the output aperture 146, such as the right marginal ray 154, will not be coupled into the main substrate 20b, and will be lost from the system. Consequently, expanding the input aperture 146 along the $\xi$ axis not only complicates the design of the collimating module, but also reduces the efficiency, and hence, the brightness of the coupled-out light waves.

FIG. 25 illustrates an embodiment, according to present invention, wherein a beam-splitting arrangement is added to the main substrate 20b, and therefore, only part of its input aperture 146 is illuminated for a proper covering of the entire surface of the output aperture 148. The embodiment is exemplified with a typical case, wherein $d_\xi = 4 \cdot \Delta d_\xi$. The edges of the partial input aperture 155 are located at a distance of $\Delta d_\xi$ inwardly, as compared to the edges of the original input aperture 144. Therefore, the lateral dimension of the partial input aperture is $d'_\xi = d_\xi - 2 \cdot \Delta d_\xi = 0.5 \cdot d_\xi$, namely, the lateral dimension of the partial input aperture 155 has been reduced by a factor of 2, as compared to the input aperture 144, and by a factor of 3, as compared to the extended input aperture 153 that should be utilized without the beam-splitting arrangement. As seen, the right marginal ray of the light wave, having an off-axis angle of $\phi_\xi$ along the $\xi$ axis, is coupled into the first substrate 20a at the right edge of the partial input aperture 155, and coupled out into the substrate 20b at the right edge of the output aperture 146. All the other rays of this light wave, including the left marginal ray 157, are coupled out through the active area of the output aperture 146, and no ray is lost. The lateral dimension of the partial input aperture of the substrate 20b along the $\xi$ axis is half of the dimension of the original input aperture 146 for the entire angular range of coupled-in light waves. The exact location of the partial input aperture of the substrate 20b, however, now depends on the off-axis angle of the incoming light waves along the $\xi$ axis, i.e., light waves having an off-axis angles of $\phi_\xi$, 0 and $-\phi_\xi$ along the $\xi$ axis will enter the main substrate 20b through the right, central and left part of the input aperture 146, respectively. The beam-splitting arrangement can be added not only to the main substrate 20b, but also to the first substrate 20a, so that the partial input aperture 155 of the substrate 20a can be reduced also along the $\eta$ axis. As a result, the overall area of the of the partial input aperture 155 can be reduced by a factor of 4, as compared to the input aperture 144, and by a factor of 6, as compared to the extended input aperture 153 that should be utilized, without using any beam-splitting arrangement. Therefore, a much simpler collimating module is now required. Furthermore, since all the rays now coupled into the first substrate 20a are also coupled into the main substrate 20b, the total efficiency, and therefore, the brightness of the coupled-out light waves, can be increased by a factor of 1.5, as compared to the non-corrected embodiment illustrated in FIG. 24. The embodiments shown in FIGS. 22 and 25 are merely illustrative examples demonstrating the benefits of utilizing the beam-splitting arrangement for light guided optical devices. This arrangement can be utilized for other different optical systems which comprise one, two or even a larger number of different substrates.

There are some issues which should be taken into consideration when designing the mixing arrangement illustrated above:

a. Since the rays which are trapped inside the substrate are not only totally reflected from the major surfaces 26 and 28, but are also partially reflected from the internal interface surfaces 67 and 101, it is important that all four of these surfaces will be parallel to each other, to ensure that the coupled rays will retain their original coupling-in direction inside the surface.

b. As illustrated hereinabove, the transparent plates 66 and 100 are thinner than the original substrate 20, and the thickness of the transparent plates might be chosen according to various considerations. On the one hand, it is easier to fabricate and cement a thicker plate, while on the other hand, with a thinner plate the effective volume of the substrate 20, which is defined as the volume of the substrate that contains the reflective surfaces, and hence, practically couples the light waves out of the substrate, is higher for a given substrate thickness. In addition, the exact ratio between the thicknesses of the plates and the substrate 20 might influence the energy interchange process inside the substrate.

c. Usually, for beamsplitters designated for full color images, the reflectance curve should be as uniform as possible for the entire photopic region, in order to minimize chromatic effects. As a result, it will be advantageous to use optical adhesive having dispersion curves similar to that of the substrate and the transparent plates. In addition, for configurations wherein an enhancing coating is applied on the interface surface, the coating can be designed to correct any dissimilarities between the dispersion curves of the adhesive and the substrate materials. Since, however, in the configurations presently illustrated, the various rays intersect with each other many times before being coupled out from the substrate 20, this requirement is no longer essential. The choice of the optical adhesives, and the dielectric coating (if applied), should take into account the entire wavelengths' spectrum of the coupled image, but the chromatic flatness of the Fresnel reflecting curves may be tolerated according to various parameters of the system.

All the various parameters of the above embodiments, such as the thickness and optical material of the plate, the exact nature of the optical adhesive, thin-film coating (if applied) and the number of the beam-splitting surfaces, can have many different possible values. The exact values of these factors are determined according to the various parameters of the optical system, as well as the specific requirements for optical quality and fabrication costs.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical device, comprising:
   an input aperture;
   an output aperture;
   a partial input aperture which covers an internal part of the input aperture wherein the area of the partial input aperture is substantially smaller than the area of the input aperture;
   a first light-transmitting substrate having at least two major surfaces and edges;
   an optical element for coupling light waves into the first light-transmitting substrate by total internal reflection;
   at least one element carried by the first light-transmitting substrate for coupling light waves out of the light-transmitting substrate, and
   a beam-splitting arrangement,
   wherein light waves coupled into the first light-transmitting substrate through the partial input aperture, are partially reflected from the beam-splitting arrangement and partially pass through it at least once, and then coupled out from the first light-transmitting substrate through the entire area of the output aperture.

2. An optical device according to claim 1, wherein the beam-splitting arrangement comprises a first transparent plate, having at least two major surfaces, one of the major surfaces of the first transparent plate being optically cemented using an optical adhesive to a major surface of the first light-transmitting substrate defining an interface surface, wherein the refractive index of the optical adhesive is substantially different than the refractive index of the first light-transmitting substrate.

3. The optical device according to claim 1, further comprising a thin film coating applied at the interface surface.

4. An optical device according to claim 1, wherein the input aperture is attached to one of the major surfaces of the first light-transmitting substrate.

5. An optical device according to claim 1, wherein the output aperture is attached to one of the major surfaces of the first light transmitting light-transmitting substrate.

6. The optical device according to claim 1, further comprising a second light-transmitting substrate having at least two major surfaces and edges; an optical element for coupling light waves into the second light-transmitting substrate by total internal reflection and at least one element carried by the second light-transmitting substrate for coupling light waves out of the light-transmitting substrate, wherein a major surface of the second light-transmitting substrate is located at least partially next to a major surface of the first light-transmitting substrate defining an intermediate aperture, and light waves coupled out from the second light-transmitting substrate are coupled into the first light-transmitting substrate through the intermediate aperture.

7. An optical device according to claim 6, wherein the input aperture is attached to one of the major surfaces of the second light-transmitting substrate and the output aperture is attached to one of the major surfaces of the first light-transmitting substrate.

8. An optical device according to claim 6, wherein the lateral dimensions of the partial input aperture are substantially smaller than the lateral dimensions of the input aperture along two different axes.

9. The optical device according to claim 6, further comprising a second flat transparent plate, having at least two major surfaces, one of the major surfaces of the second flat transparent plate being optically cemented using an optical adhesive to a major surface of the second light-transmitting substrate defining a second interface surface, wherein the refractive index of the optical adhesive is substantially different than the refractive index of the second light-transmitting substrate, light waves which are coupled into the second light-transmitting substrate are partially reflected from the second interface surface at least once.

\* \* \* \* \*